United States Patent
Tanigawa

(10) Patent No.: US 8,401,234 B2
(45) Date of Patent: Mar. 19, 2013

(54) OBJECT POSITION CORRECTION APPARATUS, OBJECT POSITION CORRECTION METHOD, AND OBJECT POSITION CORRECTION PROGRAM

(75) Inventor: Toru Tanigawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 35 days.

(21) Appl. No.: 13/238,030

(22) Filed: Sep. 21, 2011

(65) Prior Publication Data

US 2012/0008831 A1    Jan. 12, 2012

Related U.S. Application Data

(63) Continuation of application No. PCT/JP2010/007469, filed on Dec. 24, 2010.

(30) Foreign Application Priority Data

Feb. 19, 2010   (JP) ................................. 2010-034309

(51) Int. Cl.
  *G06K 9/00* (2006.01)
  *H04N 7/18* (2006.01)
(52) U.S. Cl. .................... 382/103; 382/291; 348/143
(58) Field of Classification Search .................. 382/100, 382/103–107, 155, 162, 168, 173, 181, 199, 382/203, 220, 232, 254, 274, 276, 286–291, 382/305, 312, 321; 235/462.08; 455/456.6; 702/150; 348/143
See application file for complete search history.

(56) References Cited

U.S. PATENT DOCUMENTS

| | | | | |
|---|---|---|---|---|
| 5,499,306 A | * | 3/1996 | Sasaki et al. .................... | 382/291 |
| 7,845,560 B2 | * | 12/2010 | Emanuel et al. ......... | 235/462.08 |
| 7,869,649 B2 | * | 1/2011 | Watanabe et al. ............. | 382/162 |
| 8,243,136 B2 | * | 8/2012 | Aota et al. ..................... | 348/143 |
| 8,260,325 B2 | * | 9/2012 | Bando et al. ............... | 455/456.6 |
| 2007/0211917 A1 | | 9/2007 | Nakano et al. | |
| 2007/0265741 A1 | | 11/2007 | Oi et al. | |
| 2011/0184690 A1 | * | 7/2011 | Iida et al. ...................... | 702/150 |
| 2011/0205358 A1 | | 8/2011 | Aota et al. | |

FOREIGN PATENT DOCUMENTS

JP        04-264207        9/1992
(Continued)

OTHER PUBLICATIONS

International Search Report issued Feb. 15, 2011 in International Application No. PCT/JP2010/007469.
Hirofumi Kanazaki et al., "Variational Approximation Data Association Filter", 15th European Signal Processing Conference (EUSIPCO 2007), Sep. 2007, pp. 1872-1876.

(Continued)

*Primary Examiner* — Seyed Azarian
(74) *Attorney, Agent, or Firm* — Wenderoth, Lind & Ponack, LLP.

(57) ABSTRACT

An object position correction apparatus is provided with an observing device that detects an object to be observed to obtain an observed value, an observation history data base that records an observation history of the object, a position estimation history data base that records the estimated history of the position of the object, a prediction distribution forming unit that forms a prediction distribution that represents an existence probability at the position of the object, an object position estimation unit that estimates the ID and the position of the object, a center-of-gravity position calculation unit that calculates the center-of-gravity position of the observed values, an object position correction unit that carries out a correction on the estimated position of the object, and a display unit that displays the corrected position of the object.

12 Claims, 20 Drawing Sheets

FOREIGN PATENT DOCUMENTS

| | | |
|---|---|---|
| JP | 11-271073 | 10/1999 |
| JP | 2005-141687 | 6/2005 |
| JP | 2006-338079 | 12/2006 |
| JP | 2007-078409 | 3/2007 |
| JP | 2007-249309 | 9/2007 |
| JP | 2007-303886 | 11/2007 |
| JP | 2009-211122 | 9/2009 |
| WO | 2009/113265 | 9/2009 |

OTHER PUBLICATIONS

English Translation of International Preliminary Report on Patentability and Written Opinion of the International Searching Authority, issued Sep. 27, 2012, in PCT PCT/JP2010/007469.

* cited by examiner

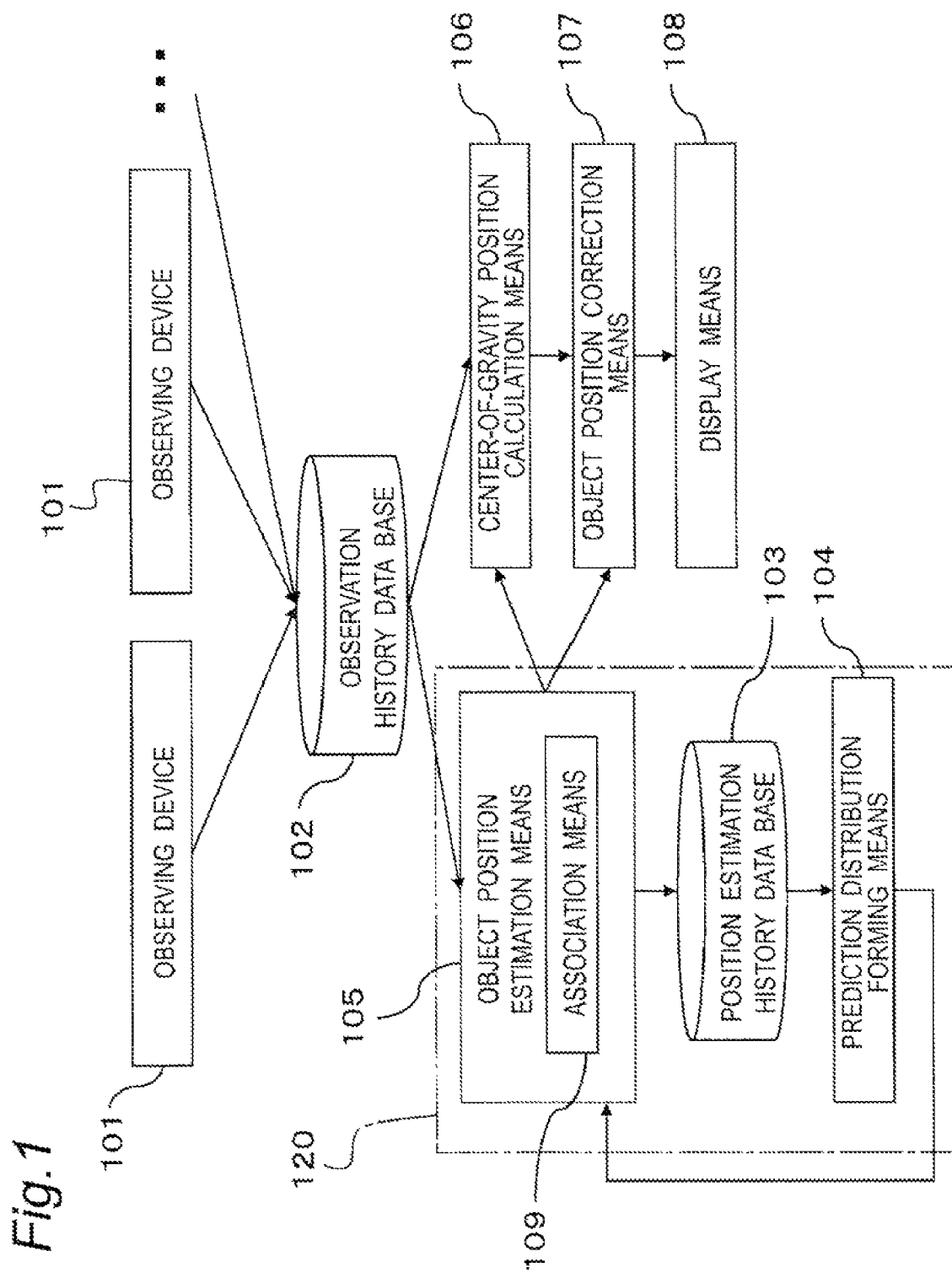

Fig.3

| IDENTIFICATION ID OF OBJECT / TIME | Obj001 | Obj002 | Obj003 | Obj004 | Obj005 |
|---|---|---|---|---|---|
| 2008/09/02 12:00:01 | $N((100,450),\begin{pmatrix}20^2 & 0\\0 & 20^2\end{pmatrix})$ | $N((160,175),\begin{pmatrix}20^2 & 0\\0 & 20^2\end{pmatrix})$ | $N((310,270),\begin{pmatrix}20^2 & 0\\0 & 20^2\end{pmatrix})$ | $N((420,210),\begin{pmatrix}25^2 & 0\\0 & 25^2\end{pmatrix})$ | $N((520,180),\begin{pmatrix}25^2 & 0\\0 & 25^2\end{pmatrix})$ |
| 2008/09/02 12:00:02 | $N((100,450),\begin{pmatrix}15^2 & 0\\0 & 15^2\end{pmatrix})$ | $N((160,175),\begin{pmatrix}15^2 & 0\\0 & 15^2\end{pmatrix})$ | $N((310,270),\begin{pmatrix}15^2 & 0\\0 & 15^2\end{pmatrix})$ | $N((420,420),\begin{pmatrix}20^2 & 0\\0 & 20^2\end{pmatrix})$ | $N((520,180),\begin{pmatrix}20^2 & 0\\0 & 20^2\end{pmatrix})$ |
| 2008/09/02 12:00:03 | $N((90,460),\begin{pmatrix}10^2 & 0\\0 & 10^2\end{pmatrix})$ | $N((180,180),\begin{pmatrix}10^2 & 0\\0 & 10^2\end{pmatrix})$ | $N((290,290),\begin{pmatrix}10^2 & 0\\0 & 10^2\end{pmatrix})$ | $N((410,430),\begin{pmatrix}15^2 & 0\\0 & 15^2\end{pmatrix})$ | $N((550,180),\begin{pmatrix}15^2 & 0\\0 & 15^2\end{pmatrix})$ |
| ⋮ | ⋮ | ⋮ | ⋮ | ⋮ | ⋮ |

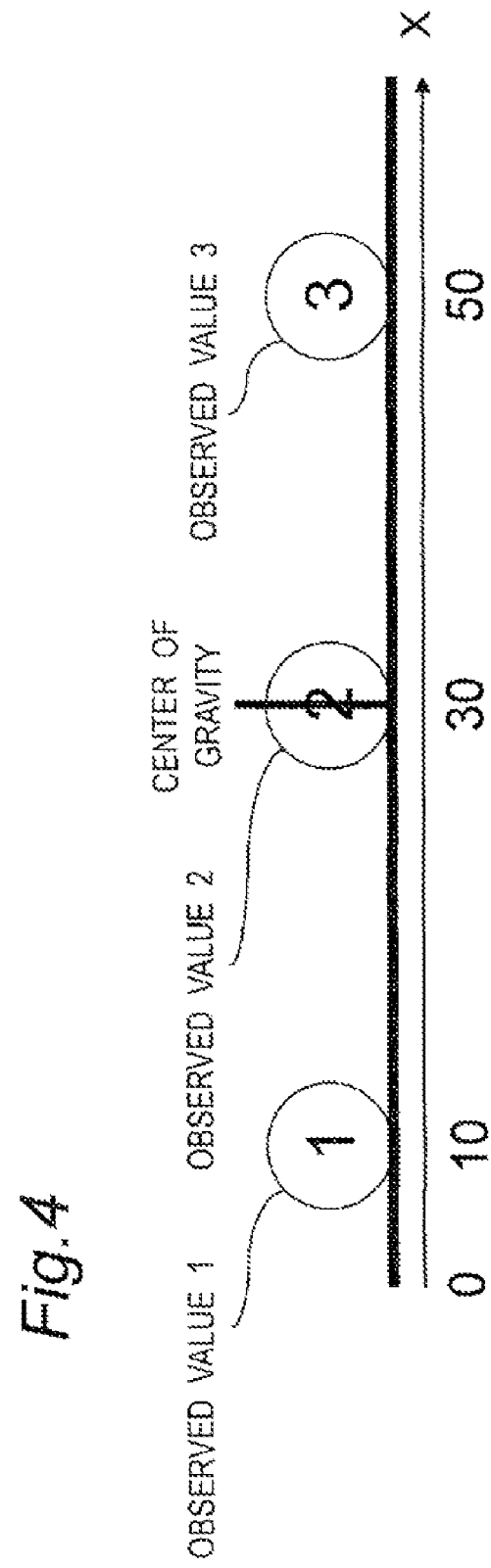

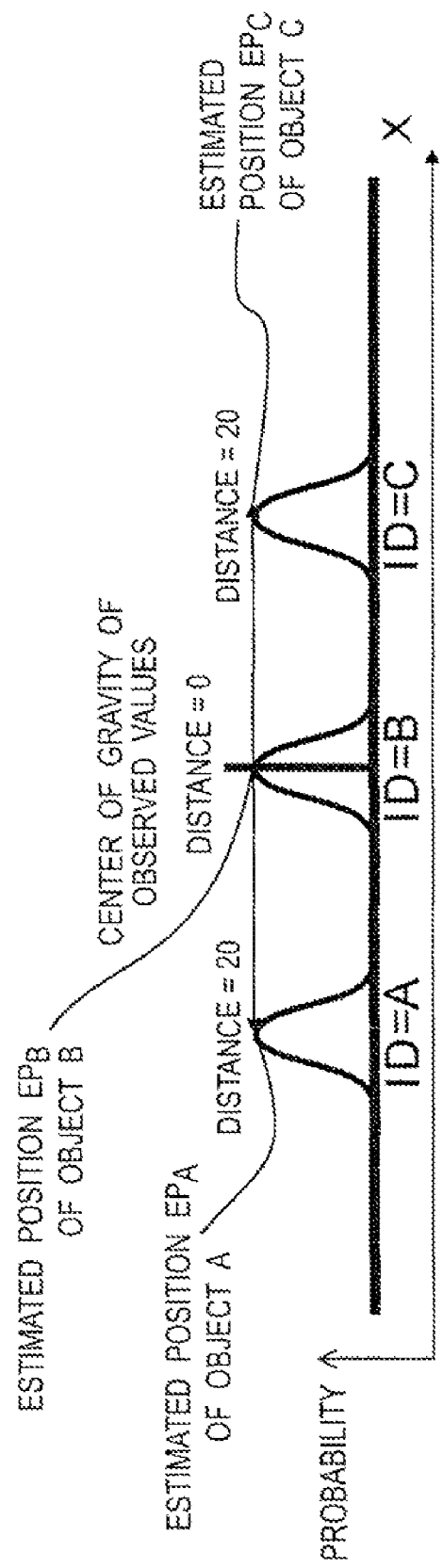

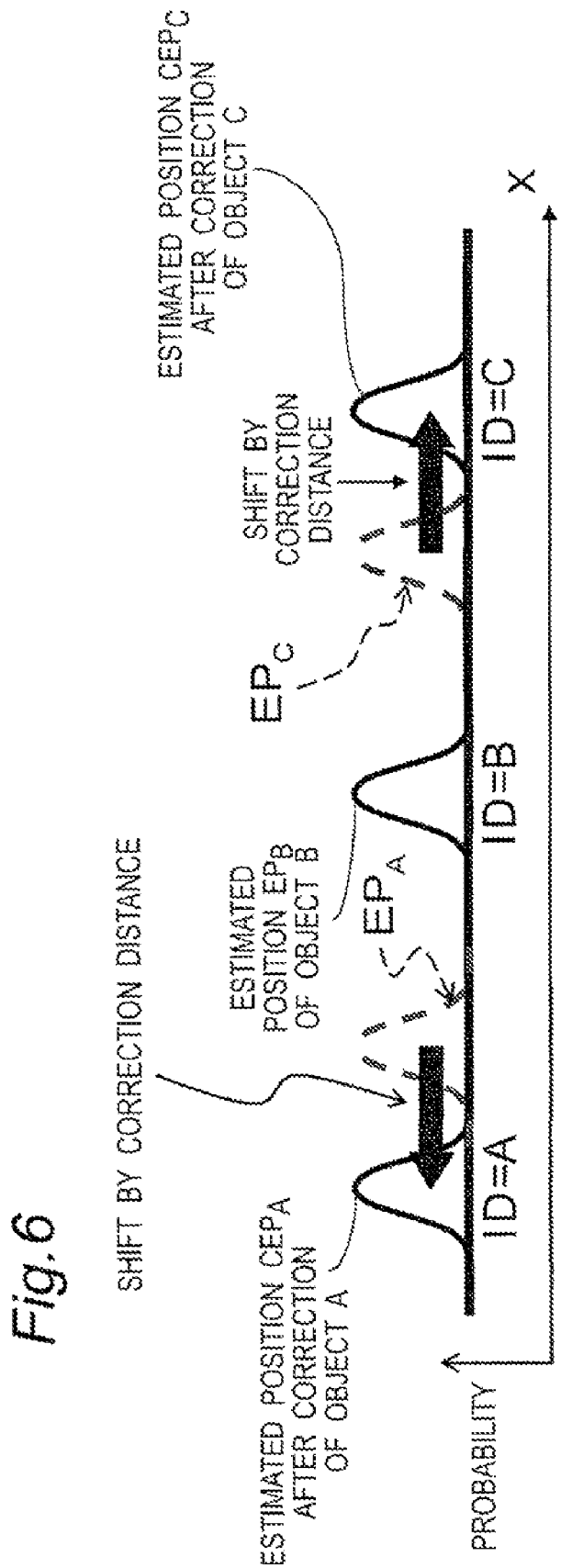

Fig.8
| OBJECT ID | TEMPLATE IMAGE |
|---|---|
| Obj001 | 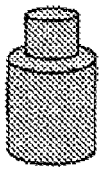 |
| Obj002 |  |
| Obj003 |  |
| Obj004 | 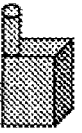 |
| Obj005 | 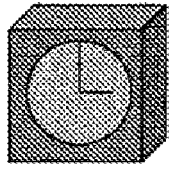 |

Fig.9

| IDENTIFICATION ID \ ARTICLE ID | Obj001 | Obj002 | Obj003 | Obj004 | Obj005 |
|---|---|---|---|---|---|
| Obj001 | 0.80 | 0.05 | 0.10 | 0.03 | 0.02 |
| Obj002 | 0.05 | 0.70 | 0.04 | 0.12 | 0.09 |
| Obj003 | 0.08 | 0.02 | 0.85 | 0.01 | 0.04 |
| Obj004 | 0.03 | 0.04 | 0.03 | 0.58 | 0.32 |
| Obj005 | 0.02 | 0.02 | 0.04 | 0.30 | 0.62 |

*Fig.10*

| OBSERVED ID | TIME | OBSERVED POSITION (x, y) | IDENTIFICATION ID |
|---|---|---|---|
| OBS001 | 2008/09/02_12:00:01 | (80,500) | Obj001 |
| OBS002 | 2008/09/02_12:00:01 | (140,160) | Obj002 |
| OBS003 | 2008/09/02_12:00:01 | (300,280) | Obj003 |
| OBS004 | 2008/09/02_12:00:01 | (450,450) | Obj005 |
| OBS005 | 2008/09/02_12:00:01 | (550,180) | Obj005 |
| OBS006 | 2008/09/02_12:00:02 | (100,510) | Obj001 |
| OBS007 | 2008/09/02_12:00:02 | (120,170) | Obj002 |
| OBS008 | 2008/09/02_12:00:02 | (290,270) | Obj003 |
| OBS009 | 2008/09/02_12:00:02 | (460,430) | Obj004 |
| OBS010 | 2008/09/02_12:00:02 | (550,190) | Obj005 |
| OBS011 | 2008/09/02_12:00:03 | (60,470) | Obj003 |
| OBS012 | 2008/09/02_12:00:03 | (170,170) | Obj002 |
| OBS013 | 2008/09/02_12:00:03 | (200,390) | Obj001 |
| OBS014 | 2008/09/02_12:00:03 | (430,440) | Obj004 |
| OBS015 | 2008/09/02_12:00:03 | (560,170) | Obj005 |
| OBS016 | 2008/09/02_12:00:04 | (100,550) | Obj001 |
| OBS017 | 2008/09/02_12:00:04 | (180,180) | Obj004 |
| OBS018 | 2008/09/02_12:00:04 | (250,200) | Obj003 |
| OBS019 | 2008/09/02_12:00:04 | (500,500) | Obj004 |
| OBS020 | 2008/09/02_12:00:04 | (480,180) | Obj005 |
| ... | ... | ... | ... |

OBJECT POSITION CORRECTION APPARATUS, OBJECT POSITION CORRECTION METHOD, AND OBJECT POSITION CORRECTION PROGRAM

This is a continuation application of International Application No. PCT/JP2010/007469, filed Dec. 24, 2010.

BACKGROUND OF THE INVENTION

The present invention relates to an object position correction apparatus for use in displaying a position of an observation subject for the user, and an object position correction method and an object position correction program for such an apparatus.

A camera is sometimes used as a sensor capable of detecting a position of an object.

The camera is not capable of providing 100% in the ID identification precision of an object (since the ID of the object is recognized from image characteristics (shape, color, or the like) obtained from the camera). Even in a case where an identification result through the camera indicates an object A, actually, an object (object B, or object C) other than the object A might be identified. In such a case, for example, the object identified by the camera is represented as having a probability of being the object A being 80%, having a probability of being the object B being 10%, and having a probability of being the object C being 10%. Moreover, the identification rate of objects having similar image characteristics becomes lower.

For example, objects, such as a tomato and an apple, or the like, having colors or shapes being similar to each other are very difficult to be identified from each other with high precision. Moreover, although slightly different depending on the function or layout of a camera, a certain degree of error is normally contained in the observation position (the result of a measured position). The identification ID and observation position of an object are collectively referred to as observed values.

Conventionally, there has been proposed a technique has been proposed by combining a plurality of observed values of a sensor having ambiguous identification ID's or observed positions of articles with one another, the position of an object is estimated by the framework of Bayesian estimation on a probability basis, while compensating for insufficiency in observation precision (Non-Patent Document 1).

In Non-Patent Document 1, however, even a slight probability (such a probability that the object identified by the camera corresponds to the object B in the above-mentioned example) is utilized in processes for estimating the object position, the estimation results tend to be influenced by observed values of the ether sensors. FIG. 19 shows an example of this state. As the result of an object identification, observed value 1 includes a probability of being an object A being 90%, and a probability of being an object B being 10%. As the result of an object identification, observed value 2 includes a probability of being an object A being 10%, and a probability of being an object B being 90%. In these observed states, upon estimation of the position, the estimated position of the object A is slightly influenced by the observed value 2, with the result that the observed position has a slight positional deviation in a direction toward the observed value 2 from the position of the observed value 1 (the detailed description of the object position estimation will be given later). Since the observed value 2 has a possibility that it is obtained by observing the object A, the estimation result of FIG. 19 is probabilistically correct. However, the estimated position with the positional deviation (for example, the average value in the Gauss's distribution) tends to form a position that gives a visually uncomfortable impression to the user. For example, the following examples are given: in a case where the observed object is a car, the estimated position of the car does not exist on a road, or in a case where the observed object is a person, the estimated position of the person is on a table.

As a technique for correcting the deviation in the estimated position, a technique using a map matching has been proposed (Patent Document 1). In this method, since vehicle position information acquired by GPS (Global Positioning System) contains an error, information to be given to the user is flexibly altered by using a map matching technique based on outputs from an axel sensor, a brake sensor, and a blinker sensor.

Prior Art Document

Patent Document

Patent Document 1: Japanese Unexamined Patent Publication No. 11-271073

Non-Patent Document

Non-Patent Document 1: Hirofumi Kanazaki, Takehisa Yairi, Kazuo Machida, Kenji Kondo, Yoshihiko Matsukawa, "Variational Approximation Data Association Filter", 15$^{th}$ European Signal Processing Conference (EUSIPCO2007).

SUMMARY OF THE INVENTION

Issues to be Resolved by the Invention

In Patent Document 1, however, a map for use in map matching needs to be preliminarily prepared.

For this reason, the objective of the present invention is to provide an object position correction apparatus that can correct an estimated position of an observation subject to a position that gives no uncomfortable impression to the user without preliminary preparing a map on which the environment information is recorded, and provide the resulting position to the user, and an object correction method and an object position correction program for such a device.

Means for Resolving the Issues

In order to achieve the above objective, the present invention has the following structures:

In accordance with a first aspect of the present invention, there is provided an object position correction apparatus comprising:

an object position estimation unit which, based on (1) an ID likelihood and (2) an observed position of each of objects obtained by respectively observing a plurality of objects existing in an environment by an observing device, as well as (3) a prediction distribution indicating an existence probability of a position of each of the objects that is formed based on estimation results of an ID and a position of each of the objects obtained based on an ID likelihood and an observed position of each of the objects acquired at time of a previous observation, estimates the ID and the position of the object so that an estimated position of the object is obtained;

a center-of-gravity position calculation unit that calculates a position of a center-of-gravity of the observed position; and an object position correction unit which, based on a distance and a direction from the center-of-gravity position calculated by the center-of-gravity position calculation unit, carries out a correction on the estimated position of the object.

In accordance with a twelfth aspect of the present invention, there is provided a method of correcting an object position comprising:

based on (1) an ID likelihood and (2) an observed position of each of objects acquired by respectively observing a plurality of objects existing in an environment by an observing device, as well as (3) a prediction distribution indicating an existence probability of a position of each of the objects that is formed based on estimation results of an ID and a position of each of the objects obtained based on the ID likelihood and the observed position of each of the objects acquired by an object position estimation unit at time of a previous observation, estimating the ID and the position of the object so that an estimated position of the object is obtained;

calculating a position of a center-of-gravity of the observed position by a center-of-gravity position calculation unit; and based on a distance and a direction from the center-of-gravity position calculated by the center-of-gravity position calculation unit, carrying out a correction on the estimated position of the object by an object position correcting unit.

In accordance with a thirteenth aspect of the present invention, there is provided an object position correcting program allowing a computer to execute a function by which, based on (1) an ID likelihood and (2) an observed position of each of objects obtained by respectively observing a plurality of objects existing in an environment by an observing device, as well as (3) a prediction distribution indicating an existence probability of a position of each of the objects that is formed based on estimation results of an ID and a position of each of the objects obtained based on an ID likelihood and an observed position of each of the objects acquired by an object position estimation unit at time of a previous observation, the ID and the position of the object are estimated so that an estimated position of the object is obtained;

a function for calculating a position of a center-of-gravity of the observed position by a center-of-gravity position calculation unit; and a function by which, based on a distance and a direction from the center-of-gravity position calculated by the center-of-gravity position calculation unit, a correction is carried out on the estimated position of the object by an object position correcting unit.

Effects of the Invention

In accordance with the present invention, the estimated position of the object can be corrected based on the positional relationship of observed positions of objects detected by an observing device. Thus, without using a map on which the environment information is recorded, the results of the object position estimation can be corrected and placed to a position that gives no uncomfortable impression to the user.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1 is a block diagram showing a structure of an object position correction apparatus in accordance with a first embodiment of the present invention;

FIG. 3 is a view showing an example of estimated history of object position estimation means recorded in a position estimation history data base of the object position correction apparatus in accordance with the first embodiment of the present invention;

FIG. 4 is a view showing a brief example for calculating a center-of-gravity position of observed values by center-of-gravity position calculation means of the object position correction apparatus in accordance with the first embodiment of the present invention;

FIG. 5 schematically shows a correcting process of an estimated position of article carried out by the object position correction means based on the center-of-gravity position calculated by the center-of-gravity position calculation means in the object position correction apparatus in accordance with the first embodiment of the present invention, and illustrates a state in which a distance and a direction from the center-of-gravity position to an estimated position (average position of distribution) of each of articles;

FIG. 6 is a view showing a state in which the estimated position (average position of distribution) of the object is corrected based on the distance and direction calculated as shown in FIG. 12 in the object position correction apparatus in accordance with the first embodiment of the present invention;

FIG. 8 is a view showing object template data recorded in an observing device of the object position correction apparatus in accordance with the first embodiment of the present invention;

FIG. 9 is a view showing an example (sensor model relating to ID's) of an ID likelihood conversion table of the object position correction apparatus in accordance with the first embodiment of the present invention;

FIG. 10 is a view showing an example of observation history of an article taken by a camera recorded in an observation history data base of the object position correction apparatus in accordance with the first embodiment of the present invention;

DETAILED DESCRIPTION OF THE EMBODIMENTS

Figure 2A:
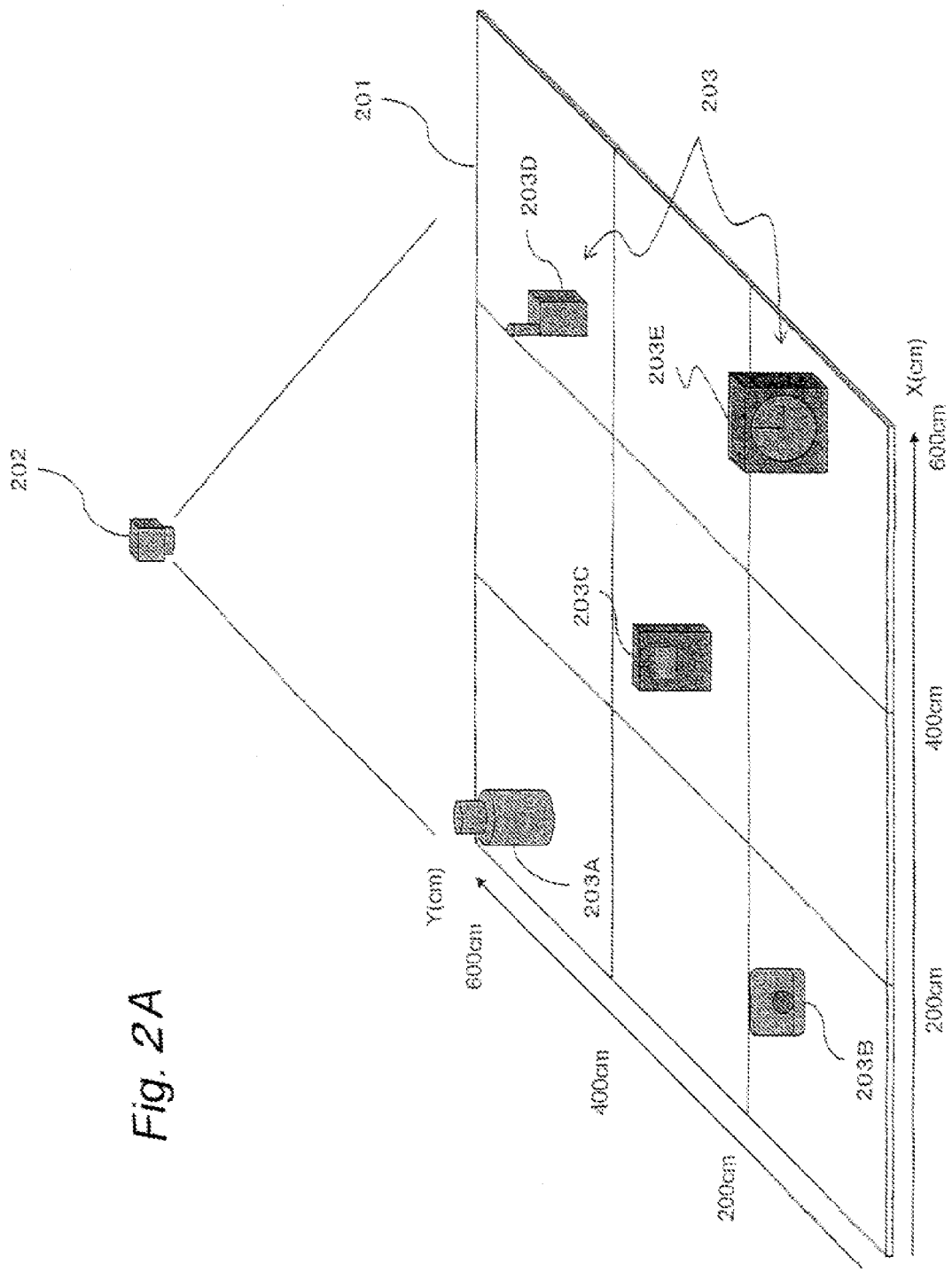
FIG. 2A is a view explaining an observation state in a room as a life space forming an environment in which an object to be observed by the object position correction apparatus of the first embodiment of the present invention exists.

Prior to the detailed description of the embodiments of the present invention with reference to the drawings, the following will describe various aspects of the present invention.

In accordance with a first aspect of the present invention, there is provided an object position correction apparatus comprising:

an object position estimation unit which, based on (1) an ID likelihood and (2) an observed position of each of objects obtained by respectively observing a plurality of objects existing in an environment by an observing device, as well as (3) a prediction distribution indicating an existence probability of a position of each of the objects that is formed based on estimation results of an ID and a position of each of the objects obtained based on an ID likelihood and an observed position of each of the objects acquired at time of a previous observation, estimates the ID and the position of the object so that an estimated position of the object is obtained;

a center-of-gravity position calculation unit that calculates a position of a center-of-gravity of the observed position; and an object position correction unit which, based on a distance and a direction from the center-of-gravity position calculated by the center-of-gravity position calculation unit, carries out a correction on the estimated position of the object.

According to a second aspect of the present invention, there is provided an object position correction apparatus according to the first aspect, wherein the object position correction unit shifts the estimated position of the object from the center-of-gravity position in a direction relative to the estimated position of the object by a length corresponding to a corrected distance calculated by performing weighting on a distance from the center-of-gravity position to the estimated position of the object.

According to a third aspect of the present invention, there is provided an object position correction apparatus according to the second aspect, wherein the object position correction unit further shifts the estimated position of the object from the center-of-gravity position in a direction relative to the estimated position of the object by a length corresponding to a distance obtained by adding a value weighted with a number of observation values outputted from the observing device to the corrected distance.

According to a fourth aspect of the present invention, there is provided an object position correction apparatus according to the second aspect, wherein the object position correction unit determines a rate of the weighting for obtaining a corrected distance based on an ID identifying function of the observing device.

According to a fifth aspect of the present invention, there is provided an object position correction apparatus according to the second aspect, wherein the object position correction unit determines a rate of the weighting for obtaining a corrected distance based on a size of a sensing area of the observing device.

According to a sixth aspect of the present invention, there is provided an object position correction apparatus according to the first aspect, wherein the object position estimation unit further comprises:

an object position estimation history data base used for recording the estimation results of the ID and the position of the object;

a prediction distribution forming unit that forms the prediction distribution indicating the existence probability at the position of the object based on the results of estimation of the ID and position of the object; and an object position estimation unit that estimates the ID and position of the object based on the prediction distribution, the ID likelihood and the observation position.

According to a seventh aspect of the present invention, there is provided an object position correction apparatus according to the first or sixth aspect, wherein the observing device further detects a plurality of objects existing within the environment and respectively acquires the ID likelihood and the observation position of each of the objects.

According to an eighth aspect of the present invention, there is provided an object position correction apparatus according to any one of the first to seventh aspects, further comprising:

a display unit for displaying results of the ID and a corrected position of the object.

According to a ninth aspect of the present invention, there is provided an object position correction apparatus according to any one of the first to eighth aspects, wherein the center-of-gravity position calculation unit calculates a center-of-gravity position for each of clusters of observation positions that are clustered based on positions thereof.

According to a tenth aspect of the present invention, there is provided an object position correction apparatus according to any one of the first to ninth aspects, wherein the object position correction unit corrects the estimated position of the object based on a number of the observation positions used by the center-of-gravity position calculation unit.

According to an eleventh aspect of the present invention, there is provided an object position correction apparatus according to the eighth aspect, wherein the display unit displays corrected results of the object position correction unit in an overlaid manner on estimation results of the object position estimation unit.

According to a twelfth aspect of the present invention, there is provided a method of correcting an object position comprising:

based on (1) an ID likelihood and (2) an observed position of each of objects acquired by respectively observing a plurality of objects existing in an environment by an observing device, as well as (3) a prediction distribution indicating an existence probability of a position of each of the objects that is formed based on estimation results of an ID and a position of each of the objects obtained based on the ID likelihood and the observed position of each of the objects acquired by an object position estimation unit at time of a previous observation, estimating the ID and the position of the object so that an estimated position of the object is obtained;

calculating a position of a center-of-gravity of the observed position by a center-of-gravity position calculation unit; and based on a distance and a direction from the center-of-gravity position calculated by the center-of-gravity position calculation unit, carrying out a correction on the estimated position of the object by an object position correcting unit.

According to a thirteenth aspect of the present invention, there is provided an object position correcting program allowing a computer to execute a function by which, based on (1) an ID likelihood and (2) an observed position of each of objects obtained by respectively observing a plurality of objects existing in an environment by an observing device, as well as (3) a prediction distribution indicating an existence probability of a position of each of the objects that is formed based on estimation results of an ID and a position of each of the objects obtained based on an ID likelihood and an observed position of each of the objects acquired by an object position estimation unit at time of a previous observation, the ID and the position of the object are estimated so that an estimated position of the object is obtained;

a function for calculating a position of a center-of-gravity of the observed position by a center-of-gravity position calculation unit; and a function by which, based on a distance and a direction from the center-of-gravity position calculated by the center-of-gravity position calculation unit, a correction is carried out on the estimated position of the object by an object position correcting unit.

Referring to the drawings, the following description will refer to embodiments of the present invention.

(First Embodiment)

FIG. 1 is a view showing a structure of an object position correction apparatus in accordance with a first embodiment of the present invention.

The object position correction apparatus in accordance with the first embodiment of the present invention is provided with an observing device 101, an observation history data base 102, a position estimation history data base 103, prediction distribution forming means 104, object position estimation means 105, center-of-gravity position calculation means 106, object position correction means 107, and display means 108. The position estimation history data base 103, the prediction distribution forming means 104, and the object position estimation means 105 may be combined with one another so as to form a single object position estimation unit 120.

FIG. 2A shows a room 201 serving as a specific example of a closed environment. This room 201 is provided with one or a plurality of cameras 202, serving as one example of an observing device 101 that forms a constituent element of the object position correction apparatus in accordance with the first embodiment of the present invention. One camera 202 is attached to a center portion of a ceiling of the room 201. Not limited to the single camera 202, a plurality of cameras may be attached thereto. In this case, suppose that there are an article 203A, an article 2033, an article 203C, an article 203D, and an article 2033 serving as examples of an object to be observed, on a floor, or a table, or the like in the room 201. Suppose that each of the articles has an ID as its inherent identification information.

Hereinafter, an arbitrary article among the article 203A, article 203B, article 203C, article 203D, and article 203E in the room 201 is representatively explained as an article 203. Additionally, for example, FIG. 2A illustrates the article 203A as a pet bottle, the article 2033 as a purse, the article 203C as a book, the article 2030 as a cellular phone, and the article 2033 as a clock.

Figure 2B:
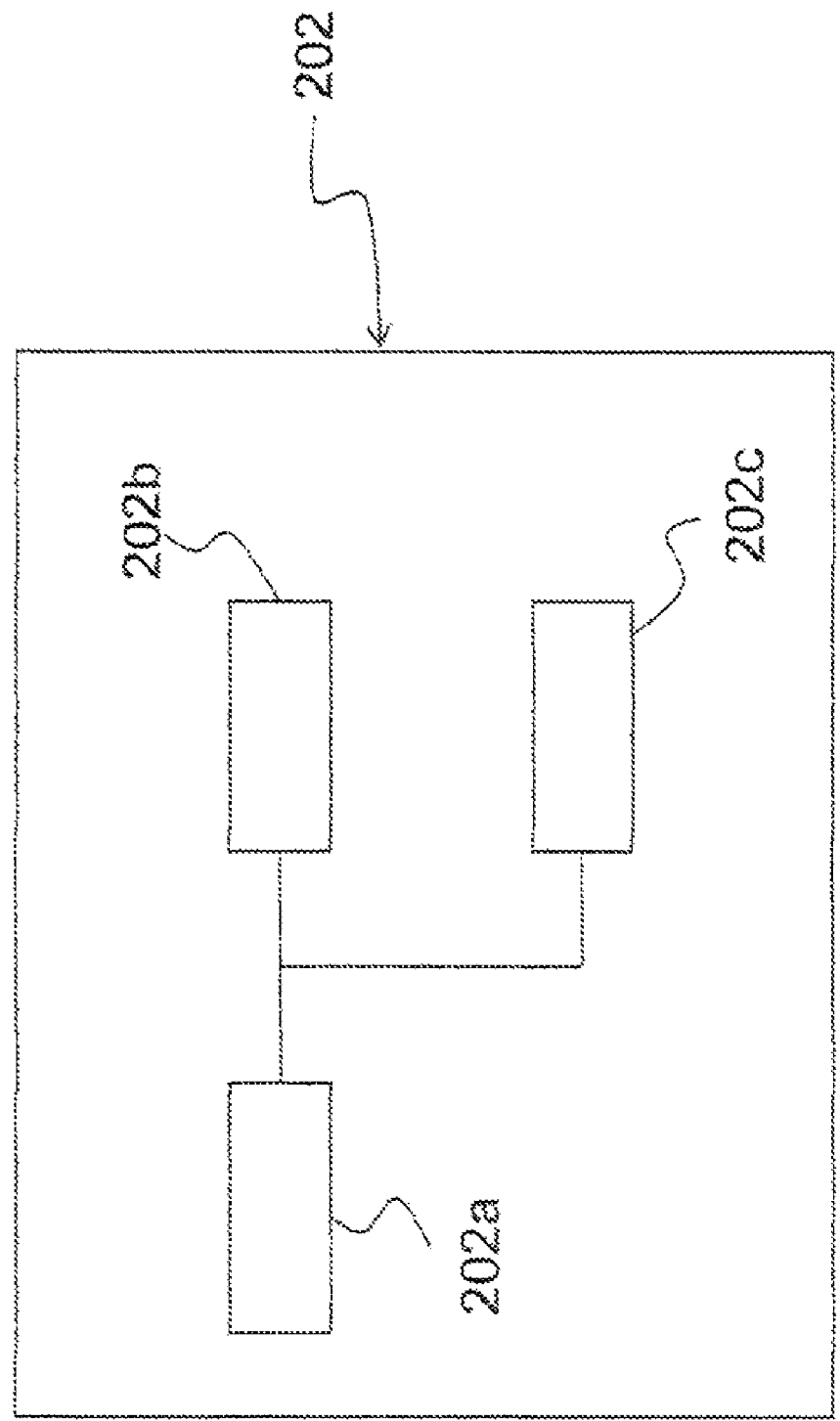
FIG. 2B is a block diagram showing a structure of a camera serving as one example of an observing device of the object position correction apparatus in accordance with the first embodiment.

Referring to FIG. 1 and FIGS. 2A and 2B, the following description will describe respective components of the object position correction apparatus in accordance with the present embodiment.

The camera 202 as one example of the observing device 101 observes the inside of the room 201 and detects the article 203 existing in the room 201. That is, as will be described later, the camera 202 carries out an image processing on image data acquired by picking up an image inside the room 201, by using a background subtraction method or the like, and detects the article 203. Upon detection of the article 203, an observation ID (an inherent ID to be added to each piece of data or information each time the data or information is acquired through an observation by the camera 202, which corresponds to an ID used for identification from the other observation data or information), a point of time at which the article 203 is detected, an identification ID and an observed position of the detected article 203 are acquired, and recorded in the observation history data base 102. In this case, the identification ID can be converted to an ID likelihood in accordance with an ID likelihood conversion table. The ID likelihood is a value that indicates the probability as to which ID of an object (article) is more likely coincident with the detected object (the article 203 in the present embodiment).

As described earlier, the ID identification precision for an object of the camera 202 cannot become 100%. For example, even when the result of identification through the camera 202 indicates an object A, there is a possibility that an object (object B, or object C) other than the object A might be actually identified. For this reason, the ID likelihood corresponds to probabilities that are assigned to all the objects that exist in the room 201 (or possibly exist in the room 201), such as, for example, a probability of being the object A being 0.8, a probability of being the object B being 0.1, and a probability of being the object C being 0.1. Additionally, this is one example for determining the ID likelihood, and the present invention is not intended to be limited by this.

The observation ID, the point of time at which the article 203 is detected, the identification ID of the detected article 203, and the observation position at which the article 203 is detected are recorded in the observation history data base 102. In this case, the identification ID refers to the object identification result of an object detected by the observing device 101. Additionally, each of the observing devices 101, for example, the camera 202, is provided with a timer used for acquiring observation cycles, time information, and the like, and the camera 202 is allowed to output the point of time at which the article 203 is detected.

In the position estimation history data base 103, the average value and variance-covariance matrix of the article 203 as the output result from the object position estimation means 105, and the last time at which the observation value used by the object position estimation means 105 was obtained are recorded.

FIG. 3 shows one example of the position estimation history data base 103.

For example, an article with an article identification ID=Obj001 is estimated as existing at a position represented by the following probability density distribution (Gauss's distribution) at time 2008/09/02_12:00:01.

$$N\left((100, 450), \begin{pmatrix} 20^2 & 0 \\ 0 & 20^2 \end{pmatrix}\right),$$  [Formula 1]

Based on the past estimated position of the article 203 recorded in the position estimation history data base 103, the prediction distribution forming means 104 estimates the probability density distribution of the position of the article 203, and outputs the result to the object position estimation means 105. The position of the article 203 estimated by the probability density distribution in the prediction distribution forming means 104 corresponds to a position at the time when the observed value to be used for estimating the position of the article 203 by the object position estimation means 105. Additionally, the object position (the latest estimated position) estimated by using the previously observed value may be normally used; however, it may be estimated by using an older estimated position obtained prior to the object position (the latest estimated position) estimated by using the previously observed value.

Based on information recorded in the observation history data base 102, the object position estimation means 105 estimates the ID likelihood and observed position of the detected article 203, and the position of the article 203 based on the prediction distribution. In this case, the object position estimation means 105 is supposed to have association means 109 that calculates an association value. In order to estimate the position of this object (for example, article 203), the observation value by the observing device 101, such as the camera 202 and the predicted position (prediction distribution) of the object at the time when the observing device 101 observed the object are required. In other words, the processing of the object position estimation may be referred to as shifting the predicted position in a direction of the observed value based on the likelihood information. The predicted position is calculated based on an estimated position of the object at the time when the observing device 101 previously observed the object, as will be described later.

The association value refers to a value that indicates how observed values (information of ID likelihood and observed position) and an actual object are associated with each other. That is, the value indicates what object with what ID has been detected to obtain the values of the ID likelihood and observed position received from the observation history data base 102. The above-mentioned object ID likelihood and observed position are values each of which indicates the degree of certainty that each observed value is obtained by observing a certain object, and the association value is represented by a product of the ID likelihood and the positional likelihood.

The following description will describe the positional likelihood. The positional likelihood is a value calculated based on a distance between the observed position and the average position of the prediction distribution, and the positional likelihood consequently becomes higher as the distance becomes shorter, while, in contrast, the positional likelihood becomes lower as the distance becomes longer. Moreover, the positional likelihood may be obtained based on Mahalanobis distance in which the positional error characteristic of the observing device 101 and the variance-covariance matrix of the prediction distribution are taken into consideration. In this case also, the positional likelihood becomes higher as Mahalanobis distance becomes shorter, while, in contrast, the positional likelihood becomes lower as Mahalanobis distance becomes longer.

The center-of-gravity position calculation means 106 calculates a center-of-gravity position of the observed value based on information recorded in the observation history data base 102. However, the observed value to be used for calculating the center-of-gravity position is defined as only the observed value that was previously used by the object position estimation means 105 for estimating the position of the article 203. It is supposed that information relating to the observed value to be used by the center-of-gravity position calculation means 106 is obtained from the object position estimation means 105. FIG. 4 shows a brief example. In the example of FIG. 4, three observed values are plotted on one dimensional coordinates. These values are obtained as observed value 1 at a position of X=10, observed value 2 at a position of X=30, and observed value 3 at a position of X=50, respectively, and the center-of-gravity position of these three observed values exists as a position of X=30.

The object position correction means 107 corrects the estimated position of the article 203 based on the center-of-gravity position calculated by the center-of-gravity position calculation means 106 and the estimated position of the article 203 given from the object position estimation means 105.

Referring to FIGS. 5 and 6, the correction of the estimated position is schematically explained.

FIG. 5 shows a state in which the object position correction means 107 calculates a distance and a direction from the center-of-gravity position (position of X−30 in FIG. 4) to the estimated position (an average position of distribution) of each article 203. As a result, the distance from the center-of-gravity position (position of X+30 in FIG. 4) to the estimated position $EP_A$ of an object A is 20, and the direction is set to −X direction. Moreover, the distance from the center-of-gravity position (position of X=30 in FIG. 4) to the estimated position $EP_B$ of an object B is 0, with no direction being set (because of the coincidence with the center-of-gravity position). The distance from the center-of-gravity position (position of X=30 in FIG. 4) to the estimated position $EP_c$ of an object C is set to 20, and the direction is set to +X direction.

FIG. 6 shows a state in which the estimated position (average position of distribution) of an object is corrected by the object position correction means 107 based on the distance and direction calculated by the object position correction means 107 in FIG. 5. That is, the estimated position of the object is shifted from the center-of-gravity position in the direction toward the estimated position by a length corresponding to the corrected distance calculated by performing weighting on the distance from the center-of-gravity position to the estimated position of the object, by the object position correction means 107. More specifically, the estimated positions of the object A and the object C that are apart from the center-of-gravity position is weighted in accordance with the distance=20 so that the positions are corrected by the object position correction means 107 in directions from the center-of-gravity position toward the respective estimated positions. The estimated position of the object A after the correction is $CEP_A$, and the estimated position of the object B after the correction is $CEP_B$. With respect to the estimated position of the object B that is the same as the center-of-gravity position, no correction is carried out. The detailed contents of these will be described later.

The display means 108 is constituted by a monitor or the like that provides the estimated position corrected by the object position correction means 107.

Figure 7:
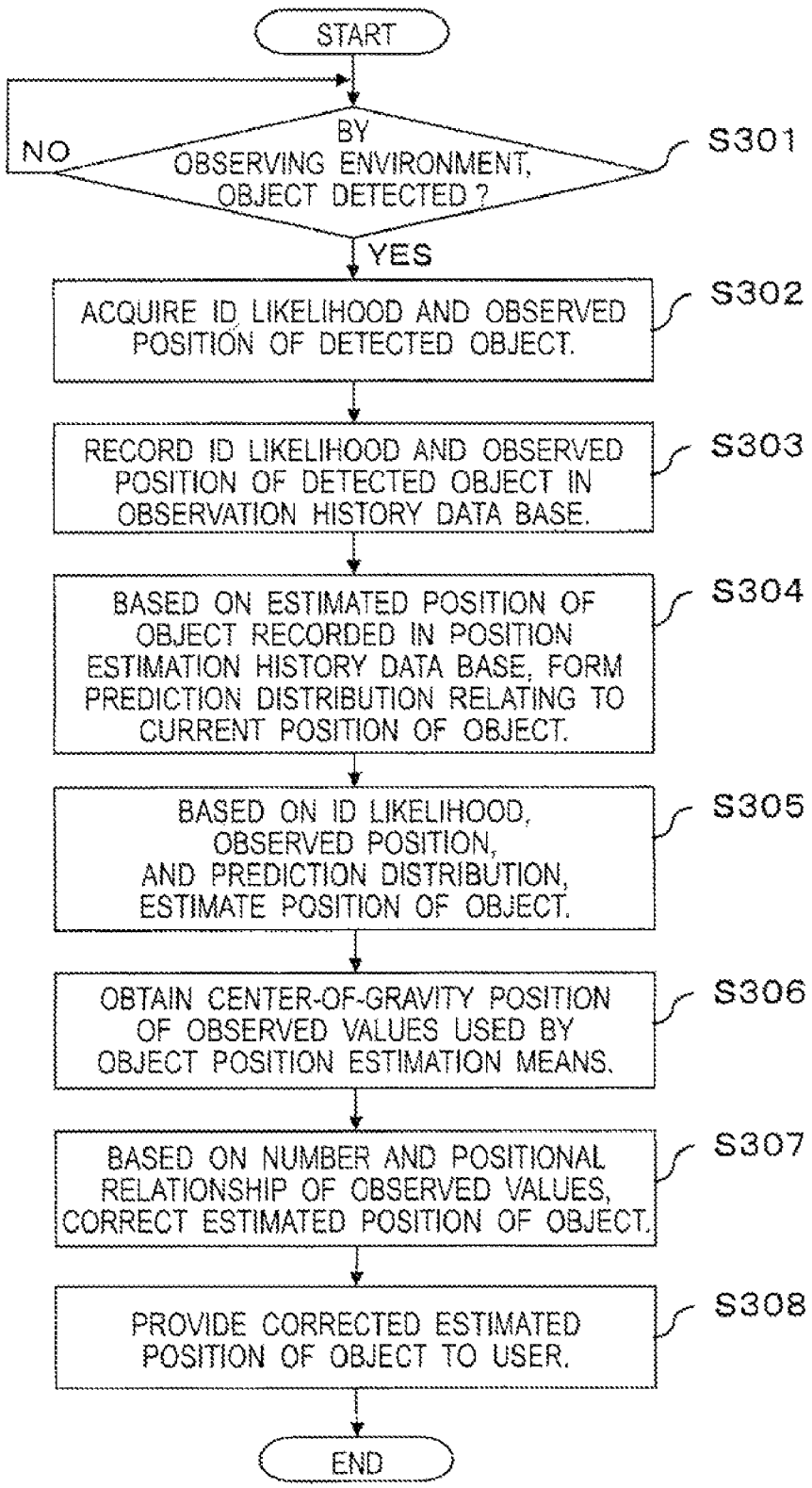
FIG. 7 is a flew chart showing the entire processes of the object position correction apparatus in accordance with the first embodiment of the present invention.

FIG. 7 is a flow chart showing the entire processes of the object position correction apparatus in accordance with the first embodiment of the present invention. The following description will describe detailed operations of the object position correction apparatus in association with the flow chart of FIG. 7.

In step S301, the inside of the room 201 is observed by the camera 202, and a process for detecting an article 203 from an image picked up by the camera 202. The specific example is given as follows:

Upon detecting the article 203 by using the camera 202, image data acquired by the image-pickup unit 202a of the camera 202 needs to be image-processed. As such a method, for example, a background subtraction method may be used. As shown in FIG. 2B, an image preliminarily picked up by the image-pickup unit 202a of the camera 202 is stored in an inner storage unit 202b that is installed in the camera 202. Thus, the background image data of the room 201 with no article 203 existing therein is compared with the current image data picked up by the camera 202 in an image processing unit 202c installed in the camera 202. Thereafter, the image processing unit 202c extracts an area having different pixel values as a subtraction area. This subtraction area corresponds to the detected article 203. In this case, however, since noise might be mixed in the image data, the image processing unit 202c may determine that the subtraction area is not the article 203, when the image processing unit 203c determines that the subtraction area is substantially small relative to the article 203. The state in which the subtraction area is substantially small relative to the article 203 is supposed to be a state in which the number of pixels in the subtraction area is a threshold value or less that is predetermined based on the minimum number of pixels that are recognizable as the article 203. In other words, when the number of pixels of the subtraction area exceeds the threshold value predetermined based on the minimum number of pixels that are recognizable as the article 203, the image processing unit 202c determines that the subtraction area corresponds to the detected article 203. Additionally, the observed position of the detected article 203 may be set to, for example, the center-of-gravity position of the subtraction area.

Moreover, by carrying out a matching process between the image of the subtraction area and a template image by the image processing unit 202c, the image processing unit 202c executes an ID identification of the article detected by the camera 202. In this case, the template images for matching are supposed to be preliminarily recorded in the inner storage unit 202b of the camera 202.

FIG. 8 shows an example of image data of article templates recorded in the inner storage unit 202b of the camera 202. Pieces of information recorded in the inner storage unit 202b of the camera 202 are identification ID's of objects from Obj001 to Obj005, and template images of the respective 5 objects with the object identification ID's of Obj001 to Obj005. Upon ID identification of an object, its ID likelihood is then determined based on an ID likelihood conversion table. Additionally, the identification ID of an object is an ID number that can uniquely determine the corresponding object.

FIG. 9 shows an example of the ID likelihood conversion table. In accordance with the ID likelihood conversion table of FIG. 9, in a case where the result of ID identification is Obj001, the probability of an object detected by the camera 202 having the object identification ID of Obj001 is 0.80. In the same manner, the probability of an object detected by the camera 202 having the object identification ID of Obj002 is 0.05, the probability thereof having the object identification ID of Obj003 is 0.10, the probability thereof having the object identification ID of Obj004 is 0.03, and the probability thereof having the object identification ID of Obj005 is 0.02. Here, the ID likelihood conversion table is also supposed to be recorded in the inner storage unit 202b of the camera 202. Additionally, by preliminarily picking up images of objects from Obj001 to Obj005 by the image pickup unit 202a of the camera 202 a plurality of times, for example, with its orientation being changed, so as to be ID identified, the ID likelihood conversion table is formed based on the tendency of ID identification errors. In the case of the ID likelihood conversion table of FIG. 9, as the results of ID identification by the images preliminarily picked up, the probabilities of the respective articles being identified as OBj001 are given as Obj001:Obj002:Obj003:Obj004:Obj005=0.80:0.05:0.10:0.03:0.02.

Moreover, the following description will be given, with the observation cycle of the camera 202 being set to 1 second. Not limited to 1 second, the observation cycle of the camera 202 may be set to a predetermined cycle.

In this case, the process for obtaining the center-of-gravity position of the background subtraction area and the process for obtaining the ID likelihood by carrying out ID identification of the article 203 by the use of the template matching, which is carried out by the image processing unit 202c of the camera 202, correspond to processes in step S302 in the flow chart of FIG. 7.

Next, in step S303, a process for recording the observed position and ID likelihood of the article 203, which is detected by the camera 202, in the observation history data base 102 is carried out by the image processing unit 202c of the camera 202.

FIG. 10 shows one example of an observation history data base 102.

Upon detection of an article 203 by the camera 202, the time and the observed position of the detection, the identification ID of the article, and an observation ID are recorded in the observation history data base 102 of FIG. 10 by the camera 202.

Since the observation cycle of the camera 202 is one second and since five articles exist in the room 201 (see FIG. 2A), five observed values are recorded by the camera 202 in the observation history data base 102 every seconds. For example, at time 2008/09/02__12:00:001, five observed values of observation ID=OBS001 to OBS005 are recorded. There is a possibility that, in a case where the camera 202 has made a detection error of the article 203 due to noise or the like, only observed values of less than might be recorded. Additionally, there is also a possibility that, in a case where the camera has erroneously made an excessive detection of an object (wall, pillar, or the like) other than the article 203 as being the article 203, observed values of more than 6 might be recorded.

For example, the observed value of observation ID=OBS001 represents that observation ID=Obj001 of an article has been detected at an observation position (80, 500) at a point of time 2008/09/02__12:00:001. Although the observed value of observation ID=OBS001 and the observed value of observation ID=OBS006 are obtained by detecting an article 203A having identification ID=Obj001 of article in FIG. 2A, its observed positions are different. This is caused by noises contained in the images picked up by the camera 202. More specifically, since how the noise is added is different every time an image is picked up, the subtraction area to be cut out by the background subtraction portion is finely changed. For this reason, the center-of-gravity position of the subtraction area forming the observed position is consequently changed.

Moreover, although the observed value observation ID=OBS004 and the observed value of observation ID=OBS009 are obtained by detecting an article 203D having identification ID=Obj004 of article in FIG. 2A, its identification ID's are different from each other. This is also caused by noises contained in the images picked up by the camera 202. More specifically, since pixels inside the subtraction area to be cut out by the background subtraction portion every time an image is picked up are finely changed by noise, the result of matching with the template is also changed so that an article is detected with different identification ID's.

Next, in step S304, the prediction distribution forming means 104 forms a prediction distribution of the article 203 based on the estimated position of the article 203 recorded in the position estimation history data base 103. A specific example thereof is described below.

In a case where an object to be position-estimated is a stationary object that does not move, such as a book or a cellular phone (in a case where an article 203C or an article 203D in the example of the present embodiment), the prediction distribution may be regarded as the same as Gauss's distribution recorded in the position estimation history data base 103.

In a case where an object serving as a subject to be position-estimated is a movable object, such as a car, a plane, or a robot, having a known moving direction or velocity, the prediction distribution is formed based on the equation of motion of the subject to be position-estimated. For example, suppose that a toy vehicle moves at a velocity of 30 cm per second in +X direction inside the room 201.

Suppose that the estimated position recorded in the position estimation history data base 103 is represented by the following expression:

$$N\left((100, 450), \begin{pmatrix} 20^2 & 0 \\ 0 & 20^2 \end{pmatrix}\right),$$ [Formula 2]

and suppose that the point of time at which the observed value to be used by the object position estimation means 105 was obtained one second later. In this case, the prediction distribution is a position (130, 450) at which the average position of the subject has been moved by 30 cm in +X direction, and the following variance-covariance matrix is given:

$$\begin{pmatrix} 25^2 & 0 \\ 0 & 25^2 \end{pmatrix}$$ [Formula 3]

The following description will describe the reason why the value of the variance-covariance matrix becomes greater. For example, in a case where the toy vehicle moves, even if the toy vehicle moves at 30 cm per second, the toy vehicle not necessarily exists just at 30 cm forward after one second later, because the toy vehicle is subjected to influences from the floor surface state (slips onto the plate, or friction caused by a carpet or the like) or air resistance. For this reason, by increasing the value of the variance-covariance matrix by the prediction distribution forming means 104, ambiguous positional precision in probability can be improved.

Moreover, in a case where an object serving as a subject to be position-estimated is an object having an unknown moving direction or velocity (having an unknown equation of motion), such as a person or an animal, by increasing only the value of the variance-covariance matrix of the estimated position recorded in the position estimation history data base 103 by the prediction distribution forming means 104, the prediction distribution can be formed by the prediction distribution forming means 104.

Additionally, when no estimated position of the article 203 is recorded in the position estimation history data base 103, the average value of prediction distribution is determined at random by the prediction distribution forming means 104. Moreover, with respect to variance, a distance of 1σ is preferably set to correspond to the distance of one side of the room 201 having a cubic shape.

Next, in step S305, an object position estimating process is carried out by the object position estimation means 105 based on the observed value of the camera 202 and the prediction distribution.

Upon receipt of the ID likelihood and the observed position of an object from the observation history data base 102, first, calculations of the association value are carried out by the association means 109.

Next, the position of the article 203 is estimated by the association means 109 by using the association value. More specifically, by using the framework of Bayesian estimation, typically represented by Kalman filter, the position of the article 203 can be estimated (update the estimated position from the previously estimated position). Based on the ID likelihood and the positional likelihood of the detected article 203, the position is updated, and at this time, the updating of the position of the article 203 is carried out only on the observed value with the association value exceeding a threshold value. The threshold value needs to be preliminarily set, that is, the threshold value needs to be estimated from experiments or the like that is preliminarily carried out. For example, in a case where an identification error tends to occur by image processing, the threshold value is desirably set to a low value. The fact that the identification error tends to occur corresponds to a fact that the ID likelihood of the detected object is small, which means that the association value also tends to become small. Moreover, all the observed values may be used irrespective of the sizes of the association value; however, in this case, the updating amount of the position of the article 203 is desirably weighted with the association value. That is, as the association value becomes higher, the updating amount of the position of the object becomes greater. This means that the rate of contribution to a position updating of observed data having high possibility of being observed data of a certain object becomes higher.

Figure 11:
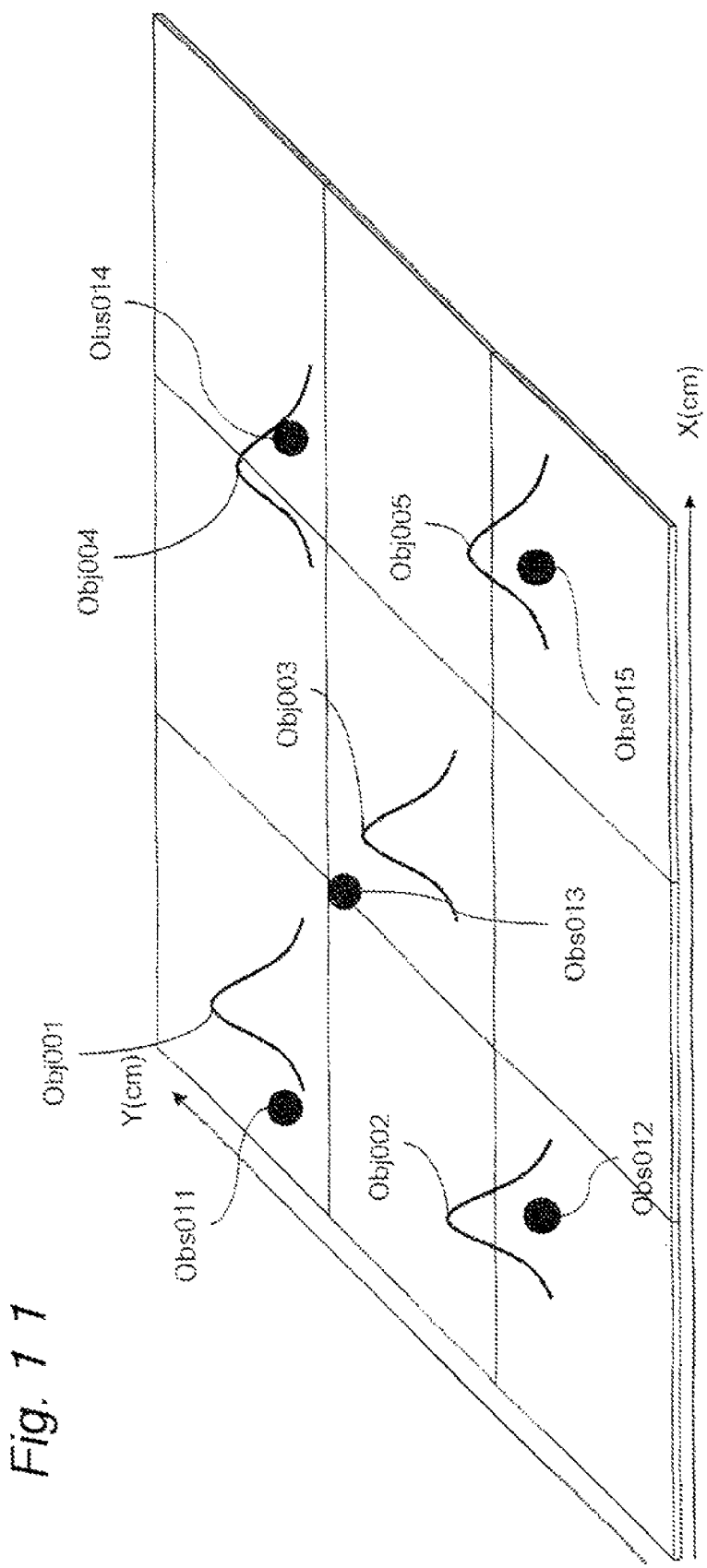
FIG. 11 is a view showing examples of an observed value obtained at point of time 12:00:03 and an estimated position of each of articles obtained at point of time 12:00:02, in the object position correction apparatus in accordance with the first embodiment of the present invention.

FIG. 11 shows examples of an observed value obtained at point of time 12:00:03 and an estimated position of each of articles obtained at point of time 12:00:02. In the examples of FIG. 11, supposing that the positional likelihood is given as the reciprocal of the distance, the association value of observed value OBS011 relative to an article with identification ID=Obj001 corresponds to a value obtained by further multiplying ID likelihood (0.08)×distance likelihood (1/44.7) by a normalizing term. In other words, in observed value OBS011 of FIG. 10, the identification result of the object ID is recorded as identification ID=Obj003, and in accordance with the ID likelihood conversion table of FIG. 9, when the camera identifies an object as identification ID=Obj003, the probability of the object detected by the camera being identification ID=Obj001 is actually 0.08. When similar calculations are carried out on the other observed values (OBS012 to OBS015), the association value of observed value OBS011 relative to an article with identification ID=Obj001 is 0.967, and the association value of OBS013 becomes 0.032 so that the association values of the other observed values become less than 0.001. In this case, supposing that the threshold value of the association value of an observed value to be used for updating the position of an article with identification ID=Obj001 is set to 0.01, two observed values of OBS011 and OBS013 are used for updating the position of the article with identification ID=Obj001.

The following description will refer to Kalman filter.

Kalman filter refers to a filter that estimates the most likely state of the object position correction apparatus under the assumption that noise is contained in both of information of the state of the object position correction apparatus (for example, position of an object in the first embodiment of the present invention) and observation data (observation information) of the observing device 101.

Figure 12:
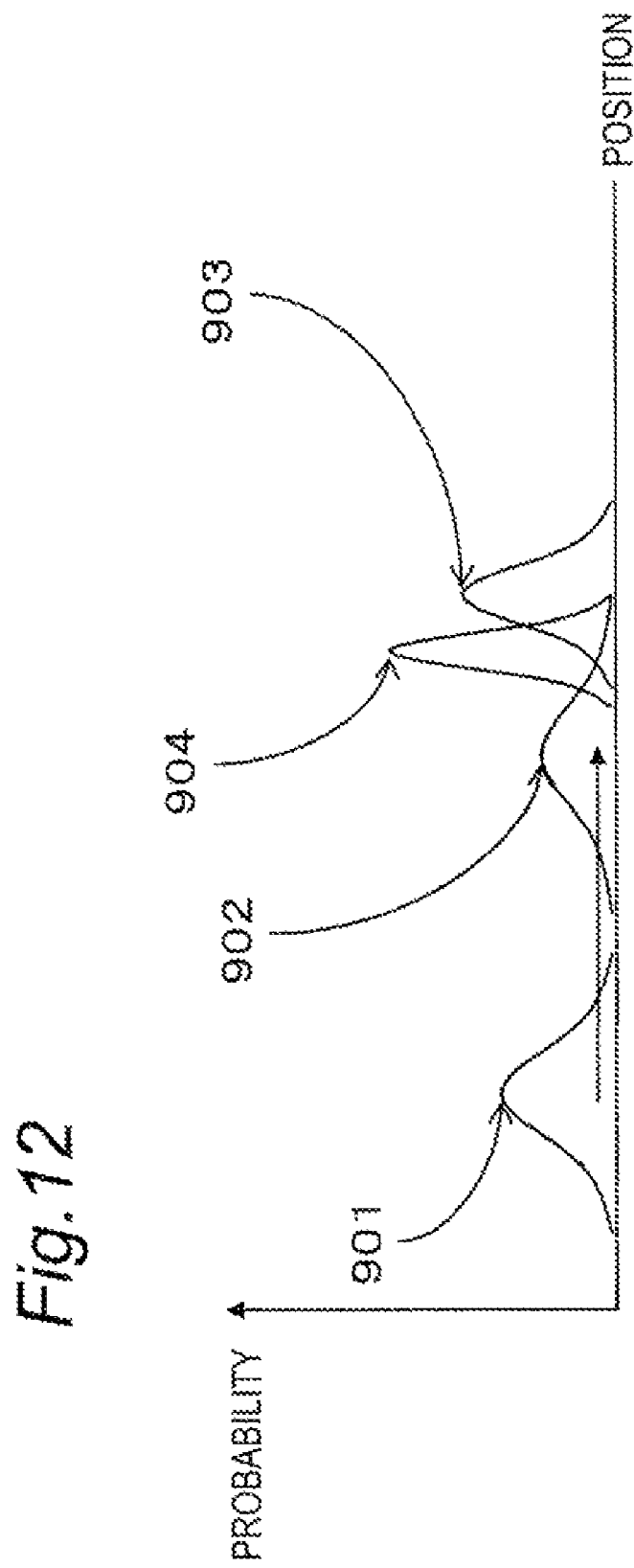
FIG. 12 is a view showing an operation example of Kalman's filter.

FIG. 12 shows an example in which Kalman filter is utilized in an object position estimating process. The axis of ordinate indicates the probability and the axis of abscissa indicates the position of an object.

When the object moves as indicated by (equation 1), the observing device 101 can obtain an observation value 903 obtained by (equation 2). In this case, A represents a motion model of the object, x represents an object position, and v represents process noise generated upon movements. Moreover, y represents an observed value, H represents an observation model that makes the object position x and the observed value y associated with each other, w represents observation noise, and t represents time.

[Formula 4]
$$x_t = A_t x_{t-1} + v_t \quad \text{(Equation 1)}$$

[Formula 5]
$$y_t = H_t x_t + w_t \quad \text{(Equation 2)}$$

Supposing that the process noise v and observation noise w are white Gaussian noise, p(w) is indicated as (equation 3), and p(v) is indicated as (equation 4). Here, N(0, Q) represents Gauss's distribution with an average of 0 and a variance of Q. In the same manner, N(0, R) represents Gauss's distribution with an average of 0 and a variance of R.

[Formula 6]
$$p(w) \sim N(0,Q) \quad \text{(Equation 3)}$$

[Formula 7]
$$p(v) \sim N(0,R) \quad \text{(Equation 4)}$$

When an observed value 903 is obtained, a preparatory probability distribution (=Prior Probability distribution) 901 (hereinafter, referred to as "pre-distribution") relating to the position of an object currently obtained is updated by the object position estimation means 105 so that a prediction probability distribution 902 (hereinafter, referred to as "predicted distribution") is formed by the object position estimation means 105. The average (position) of the predicted distribution 902 is obtained by the object position estimation means 105 by (equation 5), and the variance of the predicted distribution 902 can be obtained by the object position estimation means 105 by (equation 6). Additionally, $X_{a|b}$ represents an estimated value of X at time a based on information of time b. In (equation 5), "$X_{t|t-1}$" represents an estimated value of the object position x at time t based on information of time t−1, and in (equation 6) "$P_{t|t-1}$" represents an estimated value of P at time t based on information of time t−1. In this case, P represents the variance of distribution.

[Formula 8]
$$X_{t|t-1} = A_t x_{t-1|t-1} \quad \text{(Equation 5)}$$

[Formula 9]
$$P_{t|t-1} = A_t P_{t-1|t-1} A_t^T + Q_t \quad \text{(Equation 6)}$$

When the predicted distribution 902 is obtained by the object position estimation means 105, the object position estimation means 105 obtains a post-distribution (=Posterior probability distribution) 904 from the observed value 903 and the predicted distribution 902. The average (position) of the post-distribution 904 is obtained by the object position estimation means 105 by (equation 7), and the variance of the post-distribution can be obtained by the object position estimation means 105 by (equation 8). In this case, K represents a value referred to as Kalman gain, which is obtained by (equation 9). Kalman gain is a value used for determining the amount of updating. In a case where the precision of an observed value is good (variance R is very small), the value of Kalman gain is made greater so as to increase the amount of updating. In contrast, in a case where the precision of a pre-distribution is good (variance P is very small), the value of Kalman gain is made smaller so as to reduce the amount of updating.

[Formula 10]
$$x_{t|t} = x_{t|t-1} + K_t(y_t - H_t x_{t|t-1}) \quad \text{(Equation 7)}$$

[Formula 11]
$$P_{t|t} = (1 - K_t H_t) P_{t|t-1} \quad \text{(Equation 8)}$$

[Formula 12]
$$K_t = P_{t|t-1} H_t^T (H_t P_{t|t-1} H_t^T + R_t)^{-1} \quad \text{(Equation 9)}$$

Figure 13:
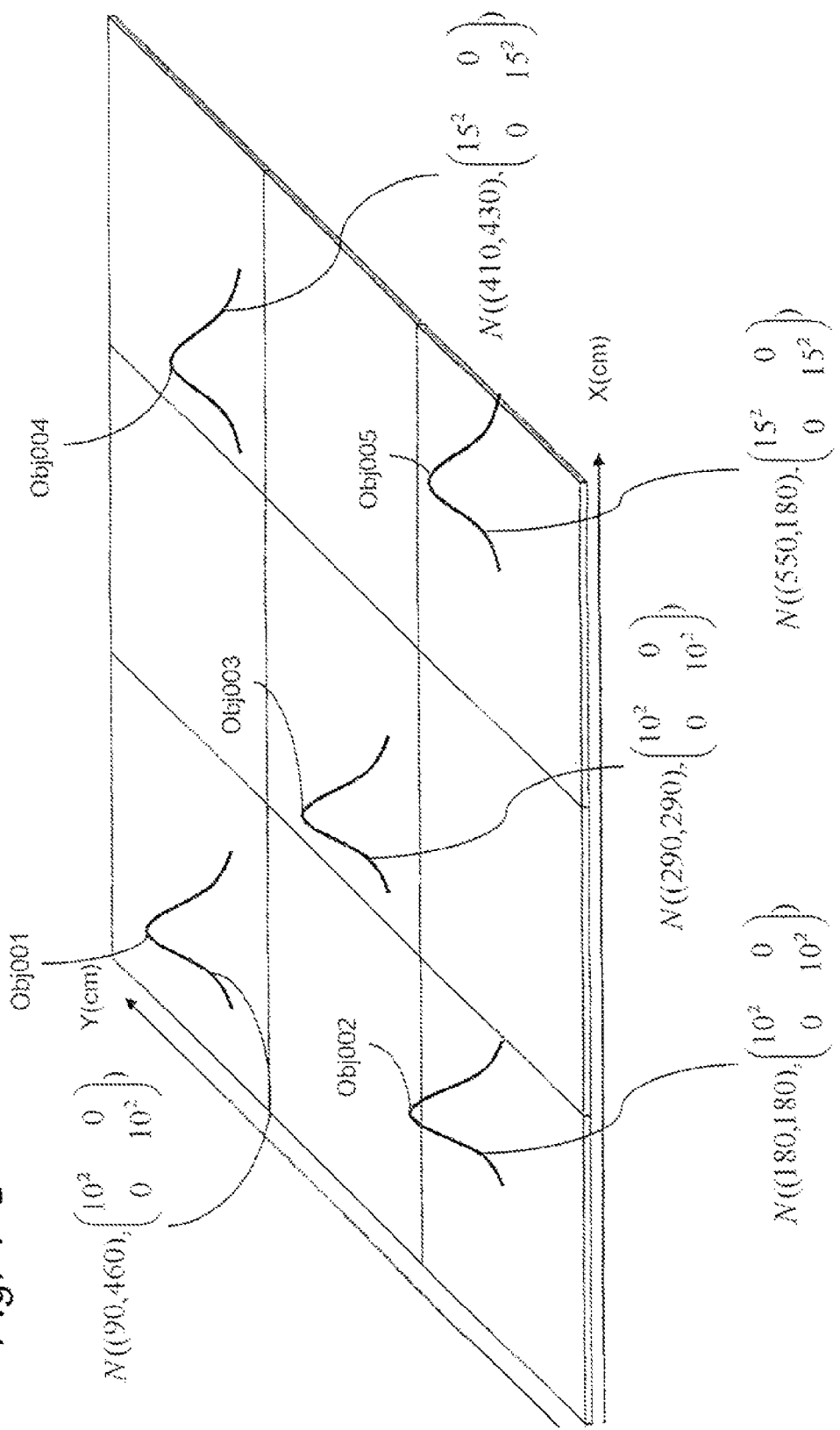
FIG. 13 is a view showing an example of an estimated state of an object position by the object position correction apparatus in accordance with the first embodiment of the present invention.

FIG. 13 shows an example of the result of estimation by the object position estimation means 105.

FIG. 13 indicates the result of an object position estimation carried out by using an observed value at time 2008/09/02__ 12:00:03. Upon comparing FIG. 13 with FIG. 10, the estimated position of an object is not estimated at the completely same position as the observed position of the camera 202. As the main reason for this, influences from the other observed values are considered. For example, the article with identification ID=Obj001 is highly possibly observed at observation ID=OBS011 having an association value of 0.967, and the positional estimation of the article with identification ID=Obj001 is carried out based on the observed value at observation ID=OBS001. However, although the association value relative to Obj001 is low, observed values other than that of observation ID=OBS001 (observation ID=OBS012, OBS013, OBS014, OSB015) have some possibilities of being observed values obtained by detecting the article with identification ID=Obj001 (see FIG. 9).

As a result, the other observed values also give influences to the positional estimation of the article with identification ID=Obj001. Since all the observed values give influences to the positional estimation of the article 203, the estimated position of the article 203 tends to be attracted to the center-of-gravity position of the observed values.

Additionally, upon carrying out a weighting process on the amount of updating of the position of the article 203 by the association value, (equation 9) can be replaced with (equation 10). D represents an association value relative to the article 203. The information relating to the weighting process with the association value is outputted from the association means 109 to the object position estimation means 105.

[Equation 13]
$$K_t = P_{t|t-1} H_t^T (H_t P_{t|t-1} H_t^T + R_t / D_{Article\ 203})^{-1} \quad \text{(Equation 10)}$$

As described above, the position of the article 203 inside the position estimation history data base 103 is updated by the object position estimation means 105. In order to updating the position of the article 203 by using all the observed values, it is necessary to repeat the above-mentioned process as many times as the number of the observed values.

Next, in step S306, a process for obtaining the center-of-gravity position of the observed values used by the object position estimation means 105 is carried out by the center-of-gravity position calculation means 106.

In order to correct the estimated position of the article 203 attracted toward the center-of-gravity position, first, the center-of-gravity position of the observed values is calculated by the center-of-gravity position calculation means 106. In this case, the observed values from which the center-of-gravity position is calculated are limited only to the observed values used by the object position estimation means 105. In this case, it is supposed that the information relating to the observed values to be used by the center-of-gravity position calculation means 106 is obtained from the object position estimation means 105. In other words, in a case where the estimation results of the object position estimation means 105 shown in FIG. 13 are corrected, the observed value to be used for obtaining the center-of-gravity position correspond to five observed values (OBS011 to OBS015) observed at time 2008/09/02_12:00:03. Moreover, the center-of-gravity position is (x, y)=(300, 310).

Moreover, as described above, although the estimated position is influenced by observed values on the periphery thereof, the influential force is not constant and varies depending on the size of the association value. Furthermore, the association value is dependent on the size of the positional likelihood. That is, the estimated position is highly possibly influenced by observed values that exist more closely thereto. Therefore, a clustering process is carried out on the position of the observed value by the center-of-gravity position calculation means 106 so that the center-of-gravity position may be obtained among the clustered observed values. By the center-of-gravity position that exists most closely from the respective estimated positions, the correction of the estimated position, which will be explained later, may be carried out. As the clustering method, for example, a k-means method may be used. In the method, first, an arbitrary number of representative values are selected from a plurality of observed values (for example, 2) at random.

The number of the representative values may be set to, for example, a number of places where an object can be easily located. Next, with respect to the respective observed values other than the representative values, distances to the respective representative values are measured. Thus, the representative value having the shortest distance is defined as a cluster to which the observed value belong. When the assignments of all the observed values have been completed, by setting the center of gravity of the respective clusters to a new representative value, the distance to each of the representative values is measured with respect to all the observed values. Thus, the representative value having the shortest distance is defined as a cluster to which the observed value belong. The representative value having the shortest distance is defined as a cluster to which the observed value belong. Hereinafter, the formation of the representative values and the assignments thereof are repeated, and when no change occurs in the clusters to which the respective observed values belong, the process is completed. All of these processes are executed in the center-of-gravity position calculation means 106.

Figure 14:
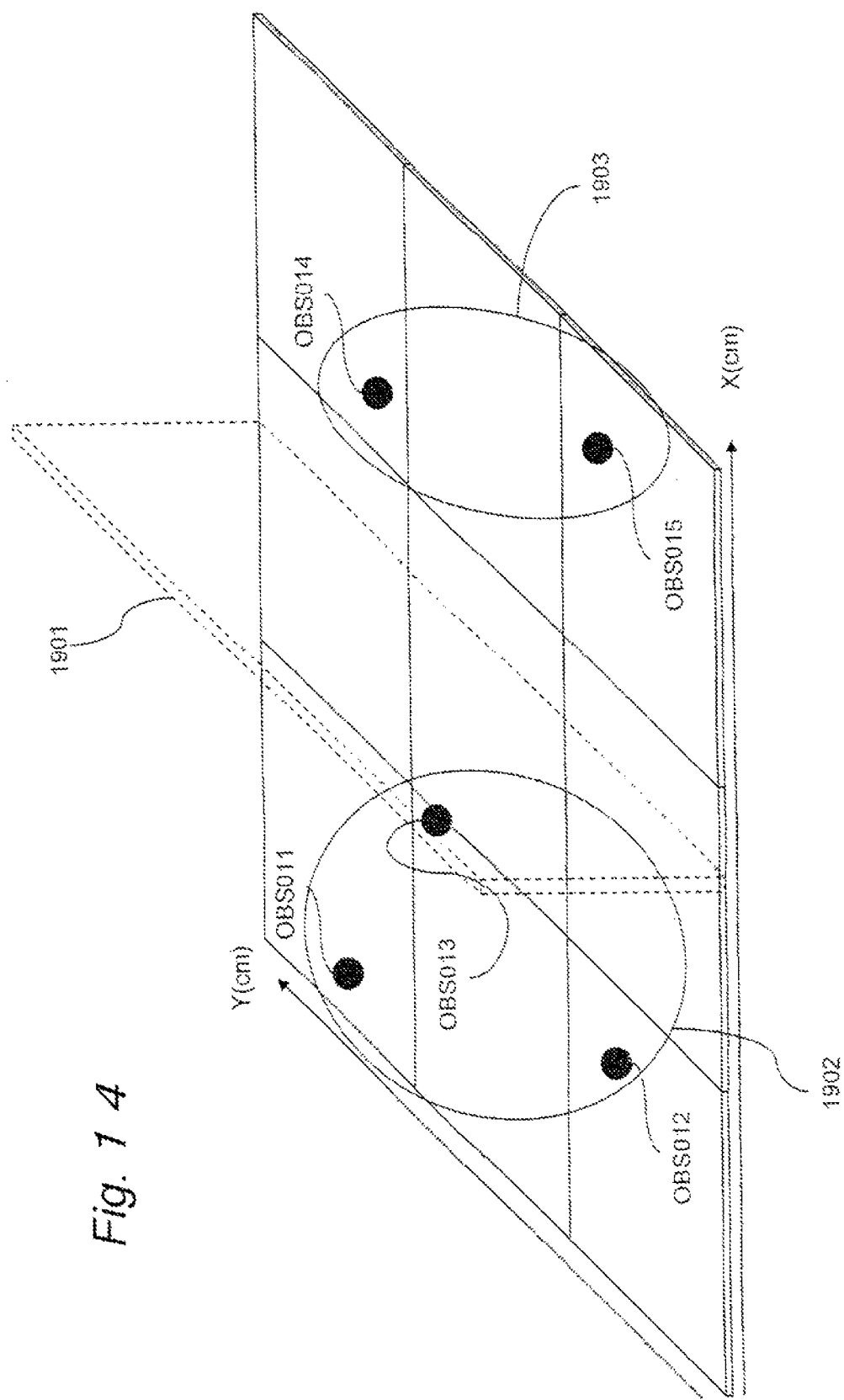
FIG. 14 is a view showing one example of the results of a clustering process in the object position correction apparatus in accordance with the first embodiment of the present invention.

Additionally, the clustering method is not intended to be limited by this. FIG. 14 shows one example of the result of the clustering process. For example, in a case where it has been preliminarily known that the environment is divided into two regions by a wall 1901, the number of the representative values may be preliminarily determined as 2. By carrying out the k-means method based on the two representative values, it is indicated that OBS011, OBS012, and OBS013 are observed values belonging to a cluster A (an area indicated by 1902 in FIG. 14), and that OBS014 and OBS015 are observed values belonging to a cluster B (an area indicated by 1903 in FIG. 14).

Next, in step S307, a correcting process is carried out on the estimated position of the article 203 based on the number of observed values and the positional relationship by the object position correction means 107.

First, the direction from the center-of-gravity position toward the estimated position is determined by the object position correction means 107 as a correcting direction. For example, the direction in which the estimated position of the object Obj004 is corrected is defined by the following equation:
[Formula 14]

$$\overline{XY}=(110,120)$$

Next, based on the distance from the center-of-gravity position to the estimated position, the distance to be corrected is determined by the object position correction means 107. As described earlier, the estimated position is normally influenced by all the observed values. For this reason, an estimated position existing near the center of gravity of the observed value consequently tends to be allowed to remain near the center of gravity, with influences to be given from the ambient observed values being cancelled. In contrast, since an estimated position existing at an end of the observed values has the same direction in which influences from the other observed values are given, the degree of influences (the amount of deviation in the estimated position) tend to become greater. As described above, as the distance from the center-of-gravity position to the estimated position becomes longer, the distance to be corrected is preferably made greater.

More specifically, based on the distance from the center-of-gravity position to the estimated position and the number of the observed values used by the object position estimation means 10E as indicated by (equation 11) and (equation 12), weighting is performed by the object position correction means 107 so that the correcting distance is calculated by the object position correction means 107. In other words, the object position correction means 107 is designed to shift the estimated position of the object in a direction from the center-of-gravity position toward the estimated position of the object by a distance obtained by adding a value weighted with the number of observed value outputted from the observing device 101 to the corrected distance. In this case, D represents the corrected distance, A represents a distance between the center-of-gravity position and the observed position, and α represents a weighting factor. The weighting factor α (in other words, a rate of weighting for use in obtaining the correcting distance) is determined based on the size of the environment (that is, the size of the sensing area of the observing device 101) and an object identifying function of the observing device 101. In a case where the object identifying function of the observing device 101 is high, the likelihood of being assigned to an erroneous object ID becomes smaller. Consequently, the influential force to update the estimated position of an erroneous object ID becomes smaller (see the explanation of the object position estimation means 105). That is, as the object identifying function of the observing device 101 becomes higher, the value of the weighting factor α is preferably made to be smaller.
[Formula 15]

$$D=f(A) \qquad \text{(Equation 11)}$$

[Formula 16]

$$f(A)=\alpha A \qquad \text{(Equation 12)}$$

Moreover, as the number of the observed values becomes greater, the number of influences received by each estimated position also becomes greater, with the result that the amount of deviation of the estimated position tends to become larger. As described above, as the number of the observed values used by the object position estimation means 105 becomes greater, the distance to be corrected is desirably made greater.

A calculation method for the correcting distance D, which uses the number of the observed values, is given by (equation 13) and (equation 14). In this case, represents a number of observed values, and β represents a weighting factor. The weighting factor β is determined based on the size of the environment and an object identifying function of the observing device 101 in the same manner as in the weightng factor α. In a case where the object identifying function of the observing device 101 is high, the likelihood of being assigned to an erroneous object ID becomes smaller. Consequently, the influential force to update the estimated position of an erroneous object ID becomes smaller (see the explanation of the object position estimation means 105). That is, as the object identifying function of the observing device 101 becomes higher, the value of the weighting factor β is preferably made to be smaller.

[Formula 17]

$$D=f(A,B) \quad \text{(Equation 13)}$$

[Formula 18]

$$f(A,B)=A\alpha+B\beta \quad \text{(Equation 14)}$$

As described above, the direction and distance of a correction are obtained for every estimated position of each of objects, and the correction of the estimated position is carried out by the object position correction means 107.

Figure 15:
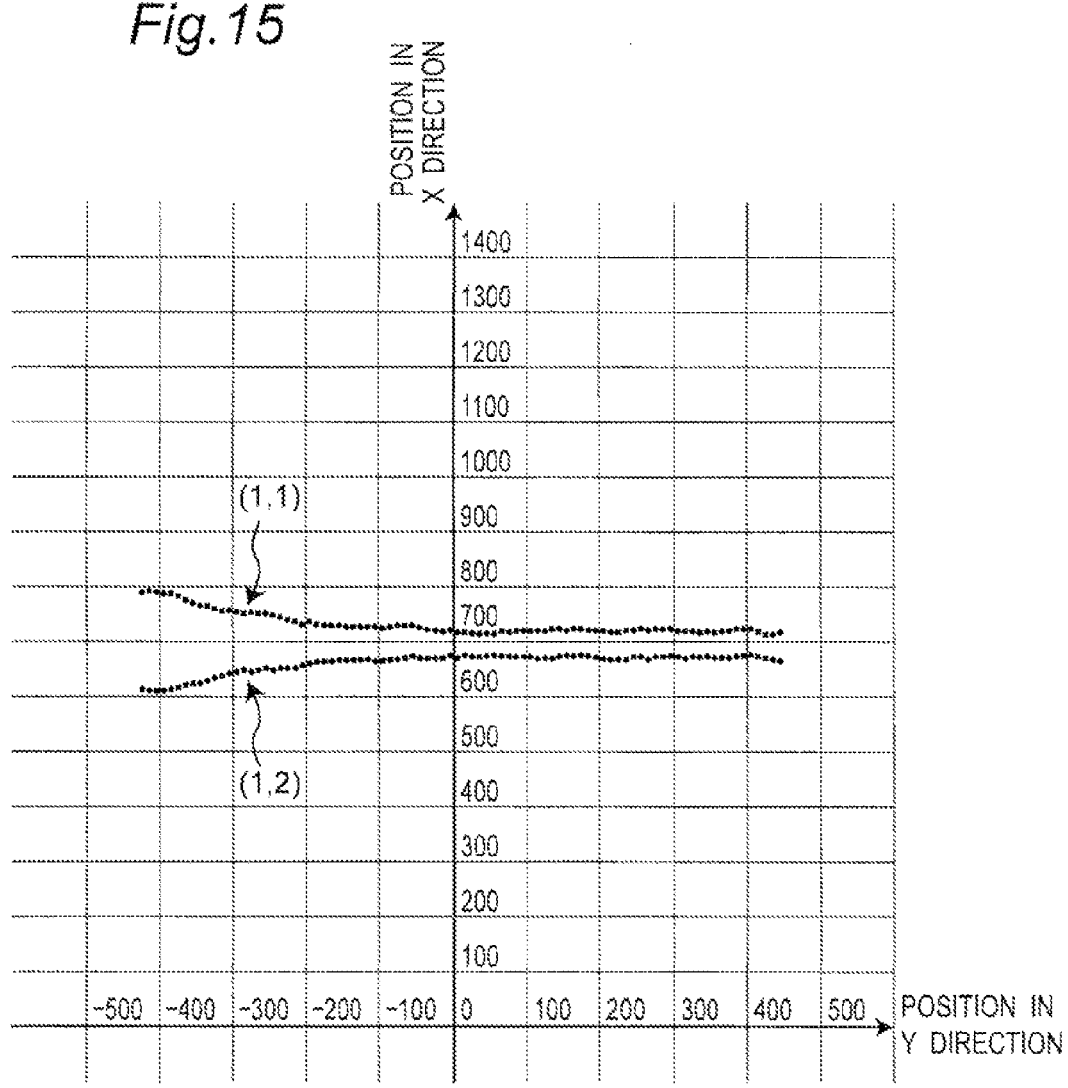
FIG. 15 is a graph showing the results of object position estimation means in the object position correction apparatus in accordance with the first embodiment of the present invention.
Figure 16:
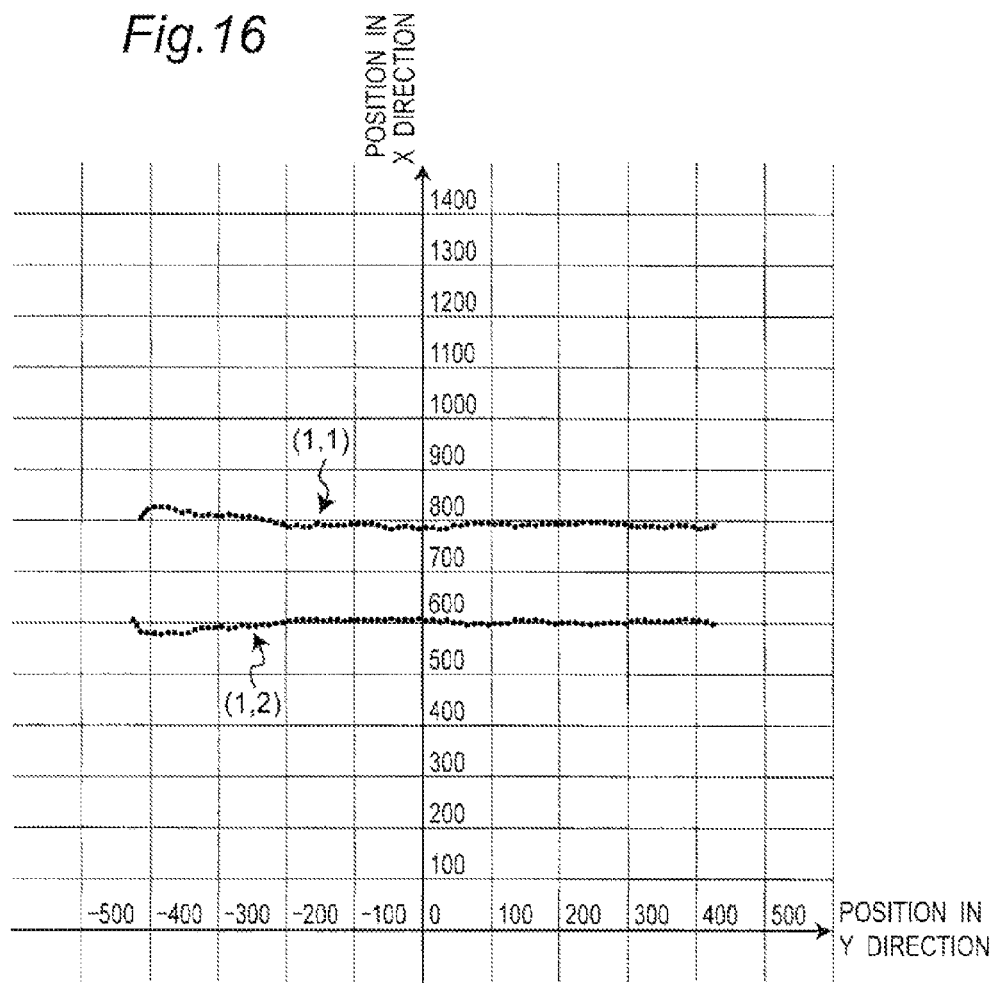
FIG. 16 is a graph showing the results of the object position correction means in the object position correction apparatus in accordance with the first embodiment of the present invention.
Figure 17:
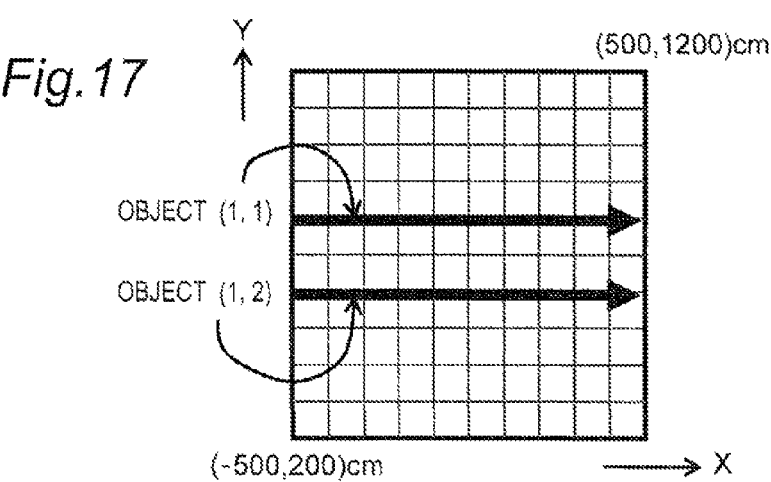
FIG. 17 is a view showing a true position of a moving locus of each of object (1, 1) and object (1, 2) in the object position correction apparatus in accordance with the first embodiment of the present invention, and showing an example in which the true position of each object is not known in the present object position correction apparatus.

FIG. 15 shows one example of the results of the process of the object position estimation means 105, and FIG. 16 shows one example of the results of the correction of the object position correction means 107. In the example of FIG. 15, the history of the estimation results of the position of each of two objects, that is, an object (1, 1) and an object (1, 2), is shown as a locus, and in the example of FIG. 16, the history of the correction results is shown as a locus. For convenience of explanation, FIG. 17 shows a true position of the moving locus of each of the object (1, 1) and object (1, 2); however, in the object position correction apparatus in accordance with the first embodiment, it is supposed that the true position of each of the objects is not known. The object (1, 1) and the object (1, 2) perform translational movements from the left end toward the right end of FIG. 17 with an interval of 200 cm being kept therebetween. More specifically, the object (1, 1) moves from coordinates (−500, 800) to coordinates (500, 800), while the object (1, 2) moves from coordinates (−500, 600) to coordinates (500, 600). Additionally, the respective objects are supposed to start movements at the same time and move at the same velocity. As the results given by the object position estimation means 105 shown in FIG. 15, it is found that the object position estimations start being influenced by the respective observed values immediately after the start of the movements, and that at a point where the objects move about 200 cm, the object (1, 1) and the object (1, 2) are mutually attracted from each other by about 80 cm. In contrast, as the results given by the object position correction means 107 shown in FIG. 16, estimations (corrections) of the object positions are carried out with the object interval between the objects (1, 1) and (1, 2) being maintained. Additionally, in this example, parameters are set as α=700 and β=2.

Next, in step S308, the estimated position corrected by the object position correction means 107 is displayed for the user by the display means 108.

The display means 108 displays the estimated position corrected by the object position correction means 107 to the user. In addition, the variance-covariance calculated by the object position estimation means 105 may be simultaneously displayed on the estimated position for the user by the display means 108. Moreover, the estimated position (estimated position before the correction) calculated by the object position estimation means 105 may be simultaneously displayed to the user by the display means 108.

Figure 18:
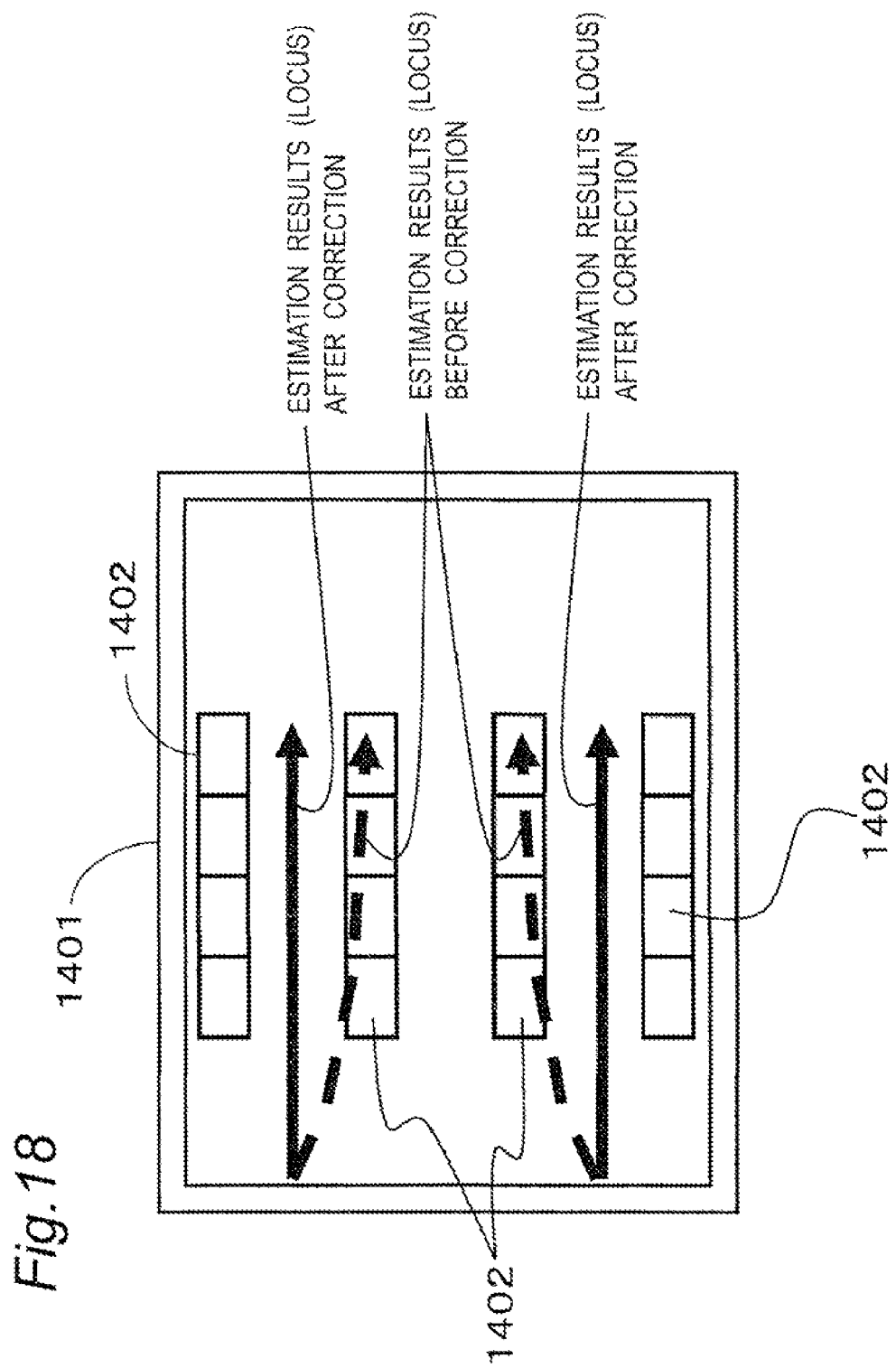
FIG. 18 is a view showing a display example of an estimated position and a correction position of each object shown in FIGS. 15 and 16 in the object position correction apparatus in accordance with the first embodiment of the present invention.
Figure 19:
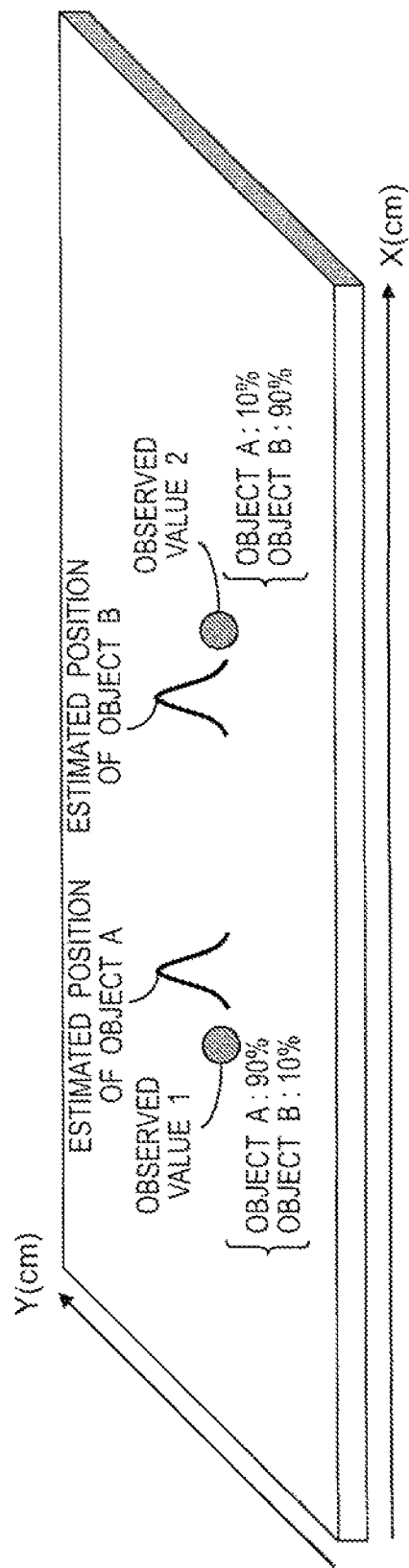
FIG. 19 is a view showing an estimated state of an object position in a conventional technique.

FIG. 18 shows display examples of the estimated positions and corrected positions of the objects shown in FIGS. 15 and 16. On the screen of a monitor 1401 shown in FIG. 18, an obstacle 1402, a locus indicated by a solid line that connects the object estimated positions before the correction by a straight line and a locus indicated by a dotted line that connects the object estimated positions after the correction by a straight line are displayed in an overlaid manner. For example, a book shelf or a table is proposed as the example of the obstacle 1402.

By the structure as described above, the estimated position of the object can be corrected based on the positional relationship and the number of the observed values of the object detected by the observing device 101. Thus, without using a map on which the environment information is recorded, the results of the object position estimation can be corrected and placed to a position that gives no uncomfortable impression to the user.

The present invention is not intended to be limited by the above-mentioned embodiments, and may be carried out in various other aspects.

Figure 20:
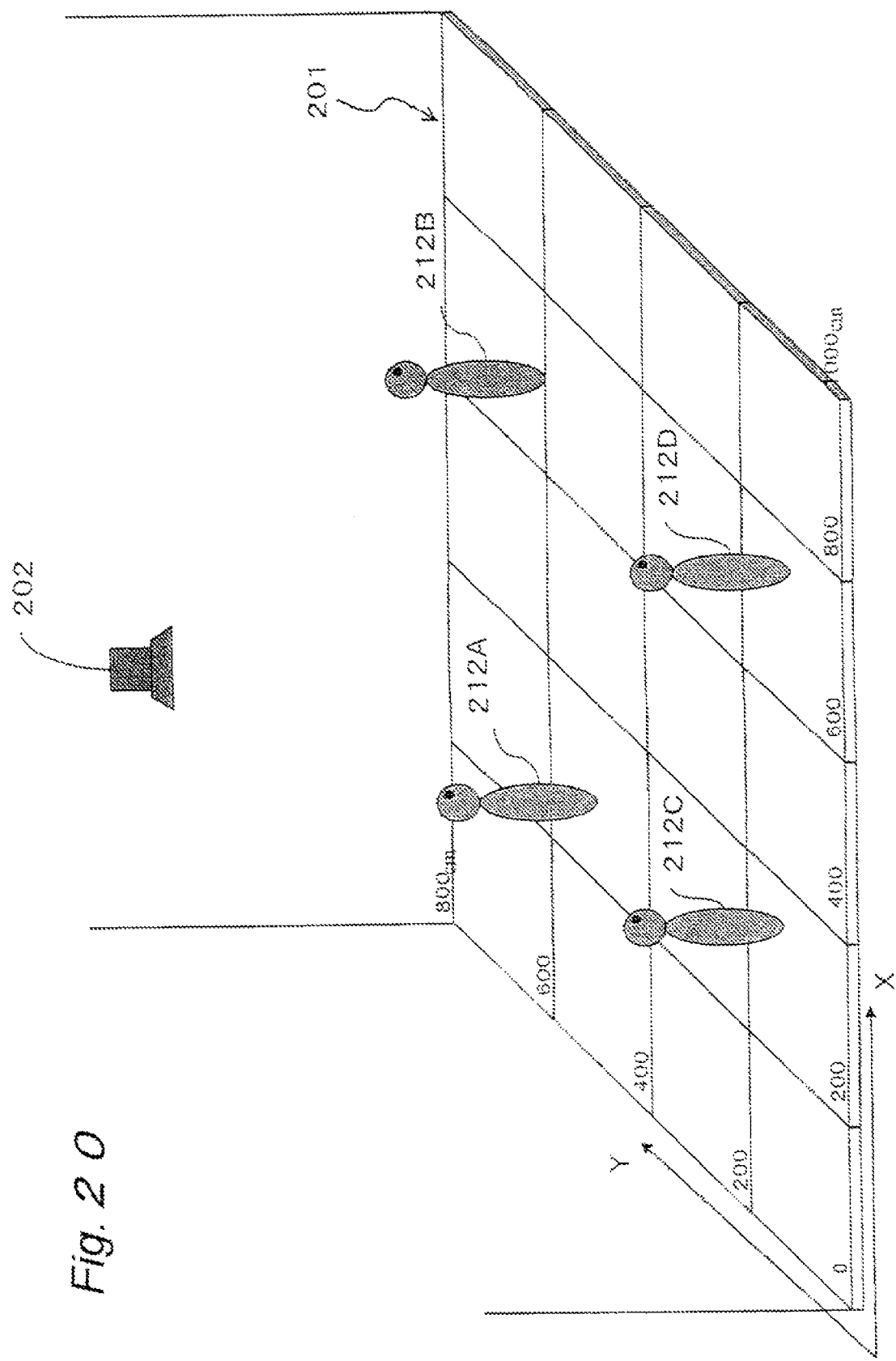
FIG. 20 is a view explaining an observation state in a room as a life space forming an environment in which a plurality of people serving as another example of objects to be observed by the object position correction apparatus of the first embodiment of the present invention exist.

For example, as shown in FIG. 20, in place of the article 203, a plurality of people 212 may be observed by the camera 202 as another example of the object.

Additionally, in the respective embodiments, the respective units, such as the object position estimation unit 120, the center-of-gravity position calculation means 106, and the object position correction means 106, or any units among those, may be prepared as software. With this arrangement, for example, as a computer program having steps for carrying out control operations of the respective embodiments of the present specification, it can be readily stored in a recording medium, such as a storage device (a hard disk, or the like), and by reading the computer program by a temporary storage device (a semiconductor memory, or the like), and by allowing a CPU to execute the program, the respective functions or steps can be carried out.

Among the above-mentioned various embodiments, by combining desired embodiments with one another on demand, it is possible to obtain the respective effects.

Industrial Applicability

In accordance with the object position correction apparatus, the object position correction method, and the object position correction program of the present invention, without using a map on which environment information is recorded, the results of the object position estimation can be corrected and placed to a position that gives no uncomfortable impression to the user. Therefore, the present invention is effectively applicable to a monitoring or displaying system for an object, or such a method, in a place where it is difficult to preliminarily form a map or where an environmental fluctuation tends to take place (such as a home, an office, a factory, or the like).

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An object position correction apparatus comprising:
    an object position estimation unit which, based on (1) an ID likelihood and (2) an observed position of each of objects obtained by respectively observing a plurality of objects existing in an environment by an observing device, as well as (3) a prediction distribution indicating an existence probability of a position of each of the objects that is formed based on estimation results of an ID and a position of each of the objects obtained based on an ID likelihood and an observed position of each of the objects acquired at time of a previous observation, estimates the ID and the position of the object so that an estimated position of the object is obtained;
    a center-of-gravity position calculation unit that calculates a position of a center-of-gravity of the observed position; and
    an object position correction unit which, based on a distance and a direction from the center-of-gravity position calculated by the center-of-gravity position calculation unit, carries out a correction on the estimated position of the object;
    wherein the object position correction unit shifts the estimated position of the object from the center-of-gravity position in a direction relative to the estimated position of the object by a length corresponding to a corrected distance calculated by performing weighting on a distance from the center-of-gravity position to the estimated position of the object.

2. The object position correction apparatus according to claim 1, wherein the object position correction unit further shifts the estimated position of the object from the center-of-gravity position in a direction relative to the estimated position of the object by a length corresponding to a distance obtained by adding a value weighted with a number of observation values outputted from the observing device to the corrected distance.

3. The object position correction apparatus according to claim 1, wherein the object position correction unit determines a rate of the weighting for obtaining a corrected distance based on an ID identifying function of the observing device.

4. The object position correction apparatus according to claim 1, wherein the object position correction unit determines a rate of the weighting for obtaining a corrected distance based on a size of a sensing area of the observing device.

5. The object position correction apparatus according to claim 1, wherein the object position estimation unit further comprises:
    an object position estimation history data base used for recording the estimation results of the ID and the position of the object;
    a prediction distribution forming unit that forms the prediction distribution indicating the existence probability at the position of the object based on the results of estimation of the ID and position of the object; and
    an object position estimation unit that estimates the ID and position of the object based on the prediction distribution, the ID likelihood and the observation position.

6. The object position correction apparatus according to claim 1, wherein the observing device further detects a plurality of objects existing within the environment and respectively acquires the ID likelihood and the observation position of each of the objects.

7. The object position correction apparatus according to claim 1, further comprising:
    a display unit for displaying results of the ID and a corrected position of the object.

8. The object position correction apparatus according to claim 7, wherein the display unit displays corrected results of the object position correction unit in an overlaid manner on estimation results of the object position estimation unit.

9. The object position correction apparatus according to claim 1, wherein the center-of-gravity position calculation unit calculates a center-of-gravity position for each of clusters of observation positions that are clustered based on positions thereof.

10. The object position correction apparatus according to claim 1, wherein the object position correction unit corrects the estimated position of the object based on a number of the observation positions used by the center-of-gravity position calculation unit.

11. A method of correcting an object position comprising:
    based on (1) an ID likelihood and (2) an observed position of each of objects acquired by respectively observing a plurality of objects existing in an environment by an observing device, as well as (3) a prediction distribution indicating an existence probability of a position of each of the objects that is formed based on estimation results of an ID and a position of each of the objects obtained based on the ID likelihood and the observed position of each of the objects acquired by an object position estimation unit at time of a previous observation, estimating the ID and the position of the object so that an estimated position of the object is obtained;
    calculating a position of a center-of-gravity of the observed position by a center-of-gravity position calculation unit; and
    based on a distance and a direction from the center-of-gravity position calculated by the center-of-gravity position calculation unit, carrying out a correction on the estimated position of the object by an object position correcting unit;
    wherein in said estimating of the ID and the position of the object, the estimated position of the object is shifted from the center-of-gravity position in a direction relative to the estimated position of the object by a length corresponding to a corrected distance calculated by performing weighting on a distance from the center-of-gravity position to the estimated position of the object.

12. A non-transitory computer readable medium having encoded thereon an object position correcting program allowing a computer to execute a function by which, based on (1) an ID likelihood and (2) an observed position of each of objects obtained by respectively observing a plurality of objects existing in an environment by an observing device, as well as (3) a prediction distribution indicating an existence probability of a position of each of the objects that is formed based on estimation results of an ID and a position of each of the objects obtained based on an ID likelihood and an observed position of each of the objects acquired by an object position estimation unit at time of a previous observation, the ID and the position of the object are estimated so that an estimated position of the object is obtained;

a function for calculating a position of a center-of-gravity of the observed position by a center-of-gravity position calculation unit; and a function by which, based on a distance and a direction from the center-of-gravity position calculated by the center-of-gravity position calculation unit, a correction is carried out on the estimated position of the object by an object position correcting unit;

wherein in said estimating of the ID and the position of the object, the estimated position of the object is shifted from the center-of-gravity position in a direction relative to the estimated position of the object by a length corresponding to a corrected distance calculated by performing weighting on a distance from the center-of-gravity position to the estimated position of the object.

\* \* \* \* \*